(12) United States Patent
Xu et al.

(10) Patent No.: US 9,812,075 B2
(45) Date of Patent: Nov. 7, 2017

(54) DISPLAY SCREEN, ELECTRONIC DEVICE AND INFORMATION PROCESSING METHOD FOR THE ELECTRONIC DEVICE

(71) Applicants: Beijing Lenovo Software Ltd., Beijing (CN); Lenovo (Beijing) Limited, Beijing (CN)

(72) Inventors: Fang Xu, Beijing (CN); Zhenhua Zhang, Beijing (CN); Ke Shang, Beijing (CN); Like Zhong, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 339 days.

(21) Appl. No.: 14/188,984

(22) Filed: Feb. 25, 2014

(65) Prior Publication Data

US 2014/0240342 A1 Aug. 28, 2014

(30) Foreign Application Priority Data

Feb. 26, 2013 (CN) .......................... 2013 1 0060627
Feb. 27, 2013 (CN) .......................... 2013 1 0062206
Mar. 8, 2013 (CN) .......................... 2013 1 0074794

(51) Int. Cl.
*G02F 1/1335* (2006.01)
*G02F 1/1337* (2006.01)
(Continued)

(52) U.S. Cl.
CPC ............ *G09G 3/36* (2013.01); *G02F 1/1336* (2013.01); *G02F 1/13363* (2013.01);
(Continued)

(58) Field of Classification Search
CPC .......... G02F 2001/133626; G02F 2001/13361; G02F 2203/62; G02F 2001/133638; G09G 2360/144
See application file for complete search history.

(56) References Cited

U.S. PATENT DOCUMENTS

2002/0159007 A1 10/2002 Suzuki et al.
2003/0098856 A1* 5/2003 Li ..................... G02F 1/133502
345/173
(Continued)

FOREIGN PATENT DOCUMENTS

CN 1399148 A 2/2003
CN 1448764 A 10/2003
(Continued)

*Primary Examiner* — Nathanael R Briggs
*Assistant Examiner* — Alexander Gross
(74) *Attorney, Agent, or Firm* — Kinney & Lange, P.A.

(57) ABSTRACT

A display screen is disclosed. The display screen comprises a light source layer, configured to be in an "on" state for providing a display light source corresponding to a first display mode, when the display screen is in the first display mode, and to be in an "off" state when the display screen is in a second display mode different from the first display mode; a liquid crystal layer, disposed in front of the light source layer; a polarizer, disposed in front of the liquid crystal layer; and a control unit, in connection with the liquid crystal layer and configured to control the liquid crystal layer. An electronic device is also disclosed, including the above described display screen and a method for processing information of the electronic device.

5 Claims, 11 Drawing Sheets

(51) Int. Cl.
*G02F 1/13363* (2006.01)
*G09G 3/36* (2006.01)
(52) U.S. Cl.
CPC ........... *G02F 2001/133618* (2013.01); *G02F 2001/133626* (2013.01); *G02F 2001/133638* (2013.01); *G02F 2203/62* (2013.01); *G02F 2413/01* (2013.01); *G09G 2320/0626* (2013.01); *G09G 2360/144* (2013.01)

(56) References Cited

U.S. PATENT DOCUMENTS

| | | | | |
|---|---|---|---|---|
| 2006/0290851 | A1* | 12/2006 | Kim | G02F 1/133555 349/114 |
| 2007/0032161 | A1* | 2/2007 | Liao | G02F 1/133553 445/66 |
| 2007/0075935 | A1* | 4/2007 | Mesmer | G09G 3/3233 345/76 |
| 2008/0002095 | A1* | 1/2008 | Kanade | G02F 1/133514 349/62 |
| 2009/0147187 | A1 | 6/2009 | Kwok et al. | |
| 2010/0014032 | A1* | 1/2010 | Jepsen | G02F 1/133514 349/114 |
| 2010/0295782 | A1* | 11/2010 | Binder | G01S 3/7864 345/158 |
| 2011/0107208 | A1* | 5/2011 | Michaelraj | G06F 3/04886 715/702 |
| 2011/0169767 | A1* | 7/2011 | Weindorf | G02F 1/13338 345/174 |
| 2011/0304592 | A1* | 12/2011 | Booth, Jr. | G09G 3/3208 345/175 |
| 2012/0013972 | A1* | 1/2012 | Gibson | G02F 1/133514 359/296 |
| 2012/0154718 | A1* | 6/2012 | Bae | G02B 5/3025 349/96 |

FOREIGN PATENT DOCUMENTS

| | | | |
|---|---|---|---|
| CN | 102053422 | A | 5/2011 |
| CN | 102326192 | A | 1/2012 |
| CN | 102782569 | A * | 11/2012 |
| CN | 102856347 | A | 1/2013 |
| CN | 102929034 | A | 2/2013 |
| WO | 2009017915 | A1 | 2/2009 |

* cited by examiner

DISPLAY SCREEN, ELECTRONIC DEVICE AND INFORMATION PROCESSING METHOD FOR THE ELECTRONIC DEVICE

CROSS-REFERENCE TO RELATED APPLICATION

This application claims the benefit of Chinese Patent Applications Nos. CN201310060627.1 filed on Feb. 26, 2013, CN201310062206.2 filed on Feb. 27, 2013, and CN201310074794.1 filed on Mar. 8, 2013 in the State Intellectual Property Office of China, the disclosures of which are incorporated herein by reference.

BACKGROUND OF THE INVENTION

1. Field of the Invention

The present invention generally relates to a field of electronic technique, in particular to a display screen and an electronic device having the same. In addition, the present invention also relates to an information processing method used for the electronic device.

2. Description of the Related Art

With continuous development in technology, the electronic technique is also rapidly developing. An increasing number of different types of electronic products have emerged, and the customers enjoy various convenience and comfortable life brought by them.

Generally, the electronic device includes a display unit for displaying data stored within the electronic device.

In the prior arts, because there are ambient light in environment where the display unit are used and the display unit will reflect the ambient light, there is a technical problem that the ambient light causes interference with the displayed contents in the display unit. Therefore, it is necessary to provide a method and an electronic device for processing information, so as to solve the technical problem about interference caused by ambient light as described above.

In the prior art, a conventional display screen uses advanced lighting materials, for example, an organic light-emitting diode (OLED), which is a self luminous display technology developed recently. OLED is considered to be newly developed technology for next generation flat panel display, since it has all of the following excellent characteristics: self-luminescence, omission of backlight sources, high contrast, small thickness, wide angle of view, quick response speed, applicability for flexible panels, wide range of operating temperature, simple construction and manufacturing process and so on. However, due to the design of OLED structure itself, its metal cathode has a very large reflectivity. Thus, the OLED display will strongly reflect the ambient light, and then the display effect is not satisfactory. As shown in FIG. 1, when outside ambient light is incident on it, the reflection of the outside ambient light would reduce the contrast of the display screen, thereby resulting in a poor user experience. For example, in an outdoor environment, the contrast of the screen will drop by 60-80%.

In the prior art, in order to solve the technical problem that the above described display screen strongly reflects the ambient light, a technical solution is provided wherein a quarter-wave plate is disposed in front of a light source layer (for example, OLED screen, as shown in FIG. 2) and in turn a polarizer is disposed in front of the quarter-wave plate. Therefore, the ambient light becomes linearly polarized light after passing through the polarizer. Then, in accordance with the principle of quarter-wave plate, optical phase of the linearly polarized light rotates by 45°, after passing through the quarter-wave plate at a first time; and then is reflected by the light source layer to pass through the quarter-wave plate at a second time. Finally, the optical phase thereof further rotates by 45° again after passing through the quarter-wave plate at the second time. Therefore, such polarized light has an optical phase which has been rotated by 90°, after passing though the same quarter-wave plate twice. Since at this time such polarized light is perpendicular to a transmission axis of the polarizer, it cannot exit from the polarizer. In this way, the reflection of the display screen to the ambient light is suppressed.

However, when implementing the technical solution as recorded by embodiments of the present application, the inventors found that the above described technical solution at least has the following technical problems:

Because the display screen of the prior art is added with the polarizer and the quarter-wave plate for blocking the reflection of the light source layer to the ambient light, and the quarter-wave plate only rotates by 45° the optical phase of the linearly polarized light passing it, the optical phases of the polarized light have the same rotated angle at each pixel point. As a result, there is a technical problem that the display light source can only be provided on basis of the light source layer for displaying image information, but cannot be provided on basis of the ambient light for displaying image information.

The display screen in the prior art adopts a technical means to rotate the optical phase of the polarized light by means of the quarter-wave plate, and thus when the display screen is determined, the thickness of the quarter-wave plate is accordingly determined. However, the ambient light has a wavelength in a certain range, rather than a fixed numeric value. Therefore, with respect to the ambient light having different wavelengths, the rotated angles of the optical phases are different, that is, not all the optical phases of the ambient light rotate by 90°. As a result, with respect to the ambient light having different wavelengths, the rotated angles of the optical phases are not consistent with each other. Further, one technical problem, i.e. a poor effect of blocking reflection of the ambient light having a part of the above described wavelengths, occurs.

In addition, in the prior art, for a display screen which can be switched between transmission and reflection, it has two operating modes: a transmission mode and a reflection mode. Presently, any effective methods to inhibit the disturbance of the ambient light for such display screen have not been proposed.

SUMMARY OF THE INVENTION

In view of this, an object of the present invention is to remove or alleviate at least one aspect of the above problems and defects in the prior arts.

Accordingly, one object of the present invention is to provide a display screen and an electronic device, in order to solve a technical problem in the prior art that a display light source for displaying an image information is provided only based on a light source layer, rather than ambient light.

Another object of the present invention is to provide a display device and an electronic device, which can ensure contrast of a display screen switchable between transmittance mode and reflection mode under in the circumstance of ambient light illumination.

A still another object of the present invention is to provide a method for processing information and an electronic device, in order to solve a technical problem in the prior art that the ambient light cause interference to the contents of the display unit.

In accordance with one aspect of the present invention, it provides a display screen, comprising:

a light source layer, configured to be in an "on" state for providing a display light source corresponding to a first display mode, when the display screen is in the first display mode, and to be in an "off" state when the display screen is in a second display mode different from the first display mode;

a liquid crystal layer, disposed in front of the light source layer;

a polarizer, disposed in front of the liquid crystal layer;

a control unit, connected with the liquid crystal layer and configured to control the liquid crystal layer;

wherein when the display screen is in the first display mode, the liquid crystal layer is controlled by the control unit so that optical phases of polarized light passing through the liquid crystal layer and corresponding to ambient light are rotated to a second angle satisfying a predetermined first condition from a first angle, further the polarized light cannot pass through the polarizer so as to block emitting of reflective light formed on the light source layer by the ambient light;

when the display screen is in the second display mode, the control unit controls optical phases of the polarized light to rotate to a third angle satisfying a predetermined second condition from the first angle by the controlling the liquid crystal layer, so that an amount of emitted light passing through the polarizer is controlled at each pixel, thereby enabling the display screen to display image information based on the ambient light.

Preferably, the display screen further comprises a protective layer, disposed in front of the polarizer for protecting the polarizer.

Preferably, in particular, the light source layer is OLED or DMS.

Preferably, in particular, the control unit is a semiconductor switch device, integrated behind the liquid crystal layer, and configured to control optical rotation states of liquid crystal at N pixels in the liquid crystal layer by changing driving voltage of the liquid crystal layer, wherein N is an integer which is larger than or equal to 1.

Preferably, in particular, the predetermined first condition is that there is a predetermined angle between the second angle and a transmittance axis of the polarizer.

Preferably, in particular, the predetermined second condition is that the third angle of $n^{th}$ pixel corresponds to the image information displayed by $n^{th}$ pixel, wherein n is a positive integer in a range of 1 to N.

In accordance with another aspect of the present invention, there is provided an electronic device, including:

a housing;

a circuit board, disposed within the housing;

a display screen, disposed in the housing, the display screen is any one provided by the embodiments of the present invention.

One or more technical solution(s) of the above described embodiment(s) of the present application at least has/have the following technical effects or advantages:

1. Because a liquid crystal layer and a control unit for controlling the liquid crystal layer are provided in the display screen, the following technical solution can be employed herein: in the first display mode, the liquid crystal layer is controlled by the control unit such that the optical phase of the polarized light corresponding to the ambient light and passing through the liquid crystal layer is rotated to a second angle satisfying a predetermined first condition from a first angle; and in the second display mode, the liquid crystal layer is controlled by the control unit such that the optical phase of the polarized light corresponding to the ambient light and passing through the liquid crystal layer is rotated to a third angle satisfying a predetermined second condition from a first angle, that is, the display screen, when in the first display mode a display light source provided by the light source layer displays the image information, is able to rotate the optical phase of the polarized light corresponding to the ambient light to the second angle satisfying the predetermined first condition, so that the polarized light cannot be emitted from the polarizer and the reflection to the ambient light is blocked upon displaying the image information based on the display light source; and meanwhile in the second display mode, the display screen, in accordance with the need for displaying the image information of each pixel point, is able to rotate the optical phase of the polarized light corresponding to the ambient light to the third angle satisfying the determined second condition. For example, a certain pixel point needs to display a black colour, the control unit controls the optical rotation state of the pixel liquid crystal in correspondence with such pixel point to enable the optical phase of the polarized light which has twice passed through this pixel liquid crystal, to change by 90° (i.e., perpendicular to the transmittance axis of the polarizer), and consequently, the pixel point displays the black colour. As such, it is possible to keep the optical phase of the polarized light passing through one certain pixel liquid crystal not to be rotated or to be rotated by 180°, so as to be parallel with the transmittance axis of the polarizer. In this way, the pixel point displays the white colour. Therefore, this way effectively solves the technical problem that it is only possible to provide the display light source by the light source layer to display the image information in the prior art, but not to provide the image information based on the ambient light. Further, the following technical effect is achieved: to display the image information based on the transmittance of the display light source in the first display mode, and to display the image information based on the reflection of the ambient light.

2. With the liquid crystal layer and the control unit for controlling the liquid crystal layer, the optical rotation state of the liquid crystal layer is controlled by the control unit such that the optical phase of the polarized light corresponding to the ambient light rotates by 90°. As the wavelengths of the ambient light vary in a predetermined range, the rotational states of the liquid crystal layer will vary accordingly under the control of the control unit, so that the optical phases of the polarized light having different wavelengths and corresponding to the ambient light all are perpendicular to the transmittance axis of the polarizer. Therefore, this effectively prevents the non-consistency of the rotational angles of the optical phases with respect to the ambient light having different wavelengths in the prior art and it also avoids poor effect of blocking the reflection of some wavelengths of the ambient light. Further it achieves the technical effects of consistently blocking to any ambient light and improves visibility under strong ambient light.

In accordance with another aspect of the present invention, there is provided a display device, applicable in an electronic device, wherein the display device comprises:

a display screen switchable between a transmittance mode and a reflection mode, configured for displaying in a transmittance mode or a reflection mode;

an electronically controlled phase retarder, located onto the display screen switchable between the transmittance mode and the reflection mode, a power terminal of the electronically controlled phase retarder being connected to a power supply;

a polarizer, provided on the electronically controlled phase retarder; and a control module, respectively connected to the display screen switchable between the transmittance mode and the reflection mode, as well as the electronically controlled phase retarder, the control module configured to control an input voltage of the electronically controlled phase retarder to be a first voltage when the display screen switchable between the transmittance mode and the reflection mode is operating in the transmittance mode, and to control the input voltage of the electronically controlled phase retarder to be a second voltage when the display screen switchable between the transmittance mode and the reflection mode is operating in the reflection mode.

Further, when the inputting voltage is set to be the first voltage, the electronically controlled phase retarder is further configured to operate in a quarter wavelength phase retarding mode, so that linearly polarized light are converted into circularly polarized light in a direction toward the display screen switchable between the transmittance mode and the reflection mode while the circularly polarized light are converted into the linearly polarized light in a direction toward the polarizer.

Further, when the inputting voltage is set to be the second voltage, the electronically controlled phase retarder is further configured to operate in a non-phase retarding mode.

Further, the display screen switchable between the transmittance mode and the reflection mode comprises a backlight module and a light modulated module disposed onto the backlight module, the backlight module comprising a light emitting source and a reflective sheet, wherein when the display screen switchable between the transmittance mode and the reflection mode is in the transmittance mode, the light emitting source is turned on and the reflective sheet is used to reflect light rays emitted from the light emitting source to the light modulated module; and when the display screen between the transmittance mode and the reflection mode is in the reflection mode, the light emitting source is turned off and the reflective sheet is used to reflect light rays incoming from the light modulated module.

Further, the electronically controlled phase retarder is made of crystals for generating electro-optic effect.

In addition, the present invention also provides an electronic device including the above described display device.

In the above embodiments of the present invention, whether reflection of the ambient light to be suppressed or not to be suppressed is controlled, by the control of voltage applied onto the electronically controlled phase retarder, in combination with the working modes of the display screen switchable between the transmittance mode and the reflection mode, so as to ensure the contrast of the display screen as described above in the circumstance of ambient light illumination.

In accordance with still another aspect of the present invention, there is provided a method for processing information, applicable in an electronic device comprising a display unit. The method comprising the steps of:

sampling a parameter information, when contents are being displayed on the display unit;

determining whether the parameter information satisfies a predetermined first condition;

adjusting a displayed parameter value corresponding to display of the display unit from a first value to a second value different from the first value, so as to improve contrast of the contents under ambient light where the electronic device is located, when the parameter information satisfies the predetermined first condition.

Optionally, when a surface of the display unit is provided with an optical unit, the displayed parameter value is an optical parameter value of the optical unit, and the process of adjusting the displayed parameter value from a first value to a second value different from the first value is in particular to adjust the optical parameter value from a first optical parameter value to a second optical parameter value different from the first optical parameter value.

Optionally, a first absorption capability of the optical unit to the ambient light when the optical parameter value is the second optical parameter value, is larger than a second absorption capability of the optical unit to the ambient light when the optical parameter value is the first optical parameter value;

a third absorption capability of the optical unit to the first light corresponding to the contents when the optical parameter value is the second optical parameter value, is larger than a fourth absorption capability of the optical unit to the first light when the optical parameter value is the first optical parameter value.

Optionally, in a case that the optical unit in particular comprises a liquid crystal layer provided on a surface of the display unit and comprising at least one liquid crystal particle and a linear polarizer provided on a surface of the liquid crystal layer, the process of adjusting the optical parameter value from the first optical parameter value to the second optical parameter value different from the first optical parameter value, is configured to adjust the at least one liquid crystal particle from a first alignment to a second alignment different from the first alignment;

wherein when the at least one liquid crystal particle is in the first alignment, the absorption capability of the linear polarizer to the ambient light is the second absorption capability, and the absorption capability of the linear polarizer to the first light is the fourth absorption capability; and when the at least one liquid crystal particle is in the second alignment, the absorption capability of the liner polarizer to the ambient light is the first absorption capability, and the absorption capability of the linear polarizer to the first light is the third absorption capability.

Optionally, when the at least one liquid crystal particle is in the second alignment, the linear polarizer is used to absorb light of the ambient light whose polarized component is parallel to a polarized direction of the linear polarizer, so that the ambient light are converted into a first linearly polarized light having a polarized direction perpendicular to an absorption direction of the linear polarizer;

the liquid crystal layer is used to convert the first linearly polarized light into a first circularly polarized light, and the display unit is used to reflect the first circularly polarized light back to the liquid crystal layer, so as to obtain a second circularly polarized light;

the liquid crystal layer is also used to convert the second circularly polarized light into a second linearly polarized light having a polarized direction parallel to an absorption direction of the linear polarizer;

the linear polarizer is also used to absorb the second linearly polarized light, and the display unit is also used to generate the first light being the third linearly polarized light;

the liquid crystal layer is also used to convert the third linearly polarized light into a third circularly polarized light, and the linear polarizer is also used for absorbing a component of the third circularly polarized light having a polarized direction parallel to the absorption direction of the linear polarizer;

when the at least one liquid crystal particle is in the first alignment, the liquid crystal layer cannot convert the first linearly polarized light into the second linearly polarized light, and thus it only filters out components of the ambient light parallel to the absorption direction of the linear polarizer by means of the linear polarizer, instead of the first linearly polarized light, so that the second absorption capability is less than the first absorption capability; and the liquid crystal layer cannot convert the third linearly polarized light into the third circularly polarized light, and the absorption direction of the linear polarizer is perpendicular to the polarized direction of the third linearly polarized light, so that it does not function to absorb the third linearly polarized light, and as such, the third linearly polarized light will not be absorbed by the linear polarizer, so that the fourth absorption capability is less than the third absorption capability.

Optionally, the process of adjusting the at least one liquid crystal particle from the first alignment to the second alignment different from first alignment is in particular to adjust a voltage applied at two ends of the liquid crystal layer from a first voltage to a second voltage different from the first voltage, so that the at least one liquid crystal particle is adjusted from the first alignment to the second alignment by the second voltage.

Optionally, the process of adjusting the displayed parameter value from the first value to the second value different from the first value is: in particular to adjust displayed brightness value of the contents from a first brightness value to a second brightness value different from the first brightness value; or to adjust a contrast value of the contents from a first contrast value to a second contrast value different from the first contrast value; or to adjust a tone value of the contents from a first tone value to a second tone value different from the first tone value.

Optionally, the parameter information is behaviour features of the user using the electronic device.

Optionally, the process of determining whether the parameter information satisfies the predetermined first condition is in particular to determine whether the behaviour features indicate that a light illumination intensity corresponding to the ambient light is larger than a threshold value of a light illumination intensity for the user.

Optionally, the process of determining whether the behaviour features indicate that the light illumination intensity corresponding to the ambient light is larger than the threshold value of the light illumination intensity for the user is in particular to determine whether the behaviour features indicate a first shading object and a head of the user meet a predetermined first relationship.

Optionally, the process of determining whether the behaviour features indicate that the light illumination intensity corresponding to the ambient light is larger than the threshold value of the light illumination intensity for the user is in particular to determine whether the behaviour features indicate a second shading object and the display unit meet a predetermined second relationship.

In a further aspect of the present invention, there is provided an electronic device including:

a sampling module, for sampling and obtaining a parameter information, when the contents are being displayed on the display unit;

a determining module, for determining whether the parameter information satisfies a predetermined first condition;

an adjusting module, for adjusting the displayed parameter value corresponding to display of the display unit from a first value to a second value different from the first value, so as to improve the contrast of the contents under the ambient light where the electronic device is located, when the parameter information satisfies the predetermined first condition.

Optionally, the displayed parameter value is in particular an optical parameter value of the optical unit, when a surface of the display unit is provided with the optical unit, the adjusting module is specifically used to:

adjust the optical parameter value from a first optical parameter value to a second optical parameter value different from the first optical parameter value.

Optionally, the first absorption capability of the optical unit to the ambient light when the optical parameter value is the second optical parameter value, is larger than the second absorption capability of the optical unit to the ambient light when the optical parameter value is the first optical parameter value; and the third absorption capability of the optical unit to the first light corresponding to the contents when the optical parameter value is the second optical parameter value, is larger than the fourth absorption capability of the optical unit to the first light when the optical parameter value is the first optical parameter value.

Optionally, when the optical unit specifically includes a liquid crystal layer provided on a surface of the display unit and including at least one liquid crystal particle and a linear polarizer provided on a surface of the liquid crystal layer, the adjusting module is in particular used to adjust the at least one liquid crystal particle from the first alignment to the second alignment different from the first alignment.

Specifically, when the at least one liquid crystal particle is in the first alignment, the absorption capability of the linear polarizer to the ambient light is the second absorption capability, and the absorption capability of the linear polarizer to the first light is the fourth absorption capability. When the at least one liquid crystal particle is in the second alignment, the absorption capability of the liner polarizer to the ambient light is the first absorption capability, and the absorption capability of the linear polarizer to the first light is the third absorption capability.

Optionally, when the at least one liquid crystal particle is in the second alignment, the linear polarizer is used to absorb light of the ambient light whose polarized component is parallel to the polarized direction of the linear polarizer, so that the ambient light are converted into the first linearly polarized light having a polarized direction perpendicular to absorption direction of the linear polarizer. The liquid crystal layer is used to convert the first linearly polarized light into a first circularly polarized light, and the display unit is also used to reflect the first circularly polarized light back to the liquid crystal layer, so as to obtain a second circularly polarized light. The liquid crystal layer is also used to convert the second circularly polarized light into a second linearly polarized light having a polarized direction parallel to absorption direction of the linear polarizer. Also, the linear polarizer is also used to absorb the second linearly polarized light, and the display unit is also used to generate the first light being the third linearly polarized light. In addition, the liquid crystal layer is also used to convert the third linearly polarized light into the third circularly polarized light, and the linear polarizer is used for absorbing the component of the third circularly polarized light having a polarized direction parallel to the absorption direction of the linear polarizer. When the at least one liquid crystal particle is in the first alignment, the liquid crystal layer cannot convert the first linearly polarized light into the second linearly polarized light, and thus it only filters out the components of the ambient light parallel to the absorption direction of the linear polarizer by means of the linear polarizer, instead of the first linearly polarized light, so that the second absorption capability is less than the first absorption capability. Moreover, the liquid crystal layer cannot convert the third linearly polarized light into the third circularly polarized light, and the absorption direction of the linear polarizer is perpendicular to the polarized direction of the third linearly polarized light, so that it does not function to absorb the third linearly polarized light. As such, the third linearly polarized light will not be absorbed by the linear polarizer, so that the fourth absorption capability is less than the third absorption capability.

Optionally, the adjusting module is in particular used:

to adjust a voltage applied at two ends of the liquid crystal layer from the first voltage to the second voltage different from the first voltage, so that the at least one liquid crystal particle is adjusted from the first alignment to the second alignment by the second voltage.

Optionally, the adjusting module is in particular used to:

adjust the displayed brightness value of the contents from the first brightness value to the second brightness value different from the first brightness value; or adjust the contrast value of the contents from the first contrast value to the second contrast value different from the first contrast value; or adjust the tone value of the contents from the first tone value to the second tone value different from the first tone value.

Optionally, the parameter information is in particular the behaviour features of the user to use the electronic device.

Optionally, the determining module is in particular used to:

to determine whether the behaviour features indicate that a light illumination intensity corresponding to the ambient light is larger than a threshold value of a light illumination intensity for the user.

Optionally, the determining module is in particular to determine whether the behaviour features indicate a first shading object and a head of the user meet a predetermined first relationship.

Optionally, the determining module is in particular to determine whether the behaviour features indicate a second shading object and the display unit meet a predetermined second relationship.

One or more technical solution(s) provided by the present application at least has/have the following technical effects or advantages:

(1) Since in the present embodiment of the present application, the following technical solution is employed, that is, when the contents are displayed on the display unit of the electronic device, the parameter information is sampled; and when the parameter information satisfies the predetermined first condition, the displayed parameter value corresponding to the display on the display unit is adjusted from the first value to the second value different from the first value, so as to further improve the contrast of the contents under the ambient light where the electronic device is located. With such solution, the technical effect of decreasing the disturbance of the ambient light to the contents of the display unit can be achieved.

(2) Since in the present embodiment of the present application, the displayed parameter value can be the optical parameter value of the optical unit provided on the surface of the display unit; and the contrast of the contents under the ambient light where the electronic device is located can be improved by adjusting the optical parameter value, thus, the technical effect of optically decreasing the disturbance of the ambient light to the contents can be achieved.

(3) Since in the present embodiment of the present application, the contrast of the contents under the ambient light where the electronic device is located can be improved by adjusting the display brightness, contrast or the tone of the contents, thus, the means for decreasing the disturbance of the ambient light to the contents can be diversified.

(4) In the present embodiment of the present application, the parameter information is in particular the behaviour features of the user to use the electronic device, and then it is determined whether the displayed parameter value needs to be adjusted on basis of the behaviour features. Since the behaviour of the user can accurately reflect the disturbance degree of the ambient light to the contents, the technical effect of more accurately adjusting the displayed parameter value can be achieved, correspondingly, this can meet the needs of the user better and further improve the experience of the user.

(5) In the present embodiment of the present application, when determining whether the behaviour features satisfy the predetermined first condition, it mainly determines whether the behaviour features indicate the light illumination intensity corresponding to the ambient light is larger than the light illumination intensity threshold value for the user. The process of determining whether the behaviour features indicate the light illumination intensity corresponding to the ambient light is larger than the light illumination intensity threshold value for the user can again be classified into several circumstances, for example, to determine whether the behaviour features indicate the first shading object and the head of the user satisfy the predetermined first relationship, to determine whether the behaviour features indicate the second shading object and the display unit have the predetermined second relationship, or the like. As a result, the means for determining whether the behaviour features satisfy the predetermined first condition can be diversified.

BRIEF DESCRIPTION OF THE DRAWINGS

These and other aspects as well as advantages of the present invention will become apparent and readily understood from the description of the preferred embodiments taking in conjunction with the accompanying drawings, in which.

DETAILED DESCRIPTION OF THE EMBODIMENTS

Figure 1:
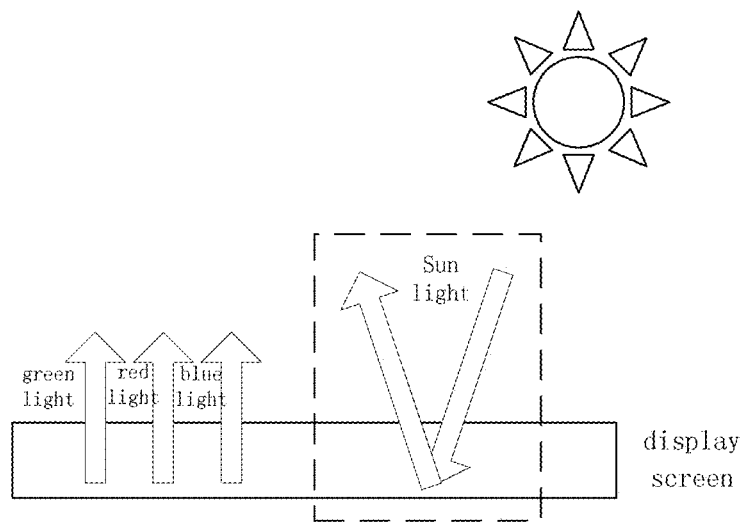
FIG. 1 is a schematic view showing effects of reflection of outside ambient light on a screen in the prior art.
Figure 2:
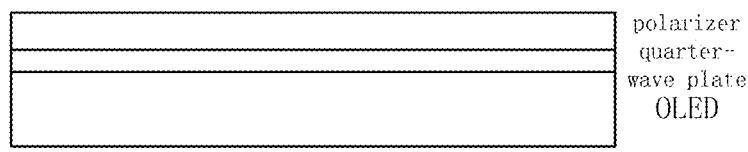
FIG. 2 is a schematic view showing a solution of OLED screen in the prior art to suppress disturbance of the ambient light.

Technical solutions of the present invention will be described hereinafter in more detail by the way of embodiment with reference to figures of the attached drawings, wherein the same or like reference numerals refer to the same or like elements throughout the specification. The explanation to the embodiment of the present invention with referring to the accompanying drawings is intended to interpret the general inventive concept of the present invention, rather than being construed as a limiting to the present invention. Please be noted that where appropriate, embodiments of the present application and features therein can be combined in any manner.

An embodiment of the present application provides a display screen, in order to solve the technical problem of the prior art that the display screen can only provide a display light source for displaying image information based on the light source layer, but cannot do this based on ambient light.

To this end, technical solutions of embodiments of the present application have the following general inventive concept:

The display screen includes:

a light source layer, configured to be in an "on" state for providing a display light source corresponding to a first display mode, when the display screen is in the first display mode, and to be in an "off" state when the display screen is in a second display mode different from the first display mode;

a liquid crystal layer, disposed in front of the light source layer;

a polarizer, disposed in front of the liquid crystal layer;

a control unit, connected with the liquid crystal layer and configured to control the liquid crystal layer;

wherein when the display screen is in the first display mode, the liquid crystal layer is controlled by the control unit so that optical phase of polarized light passing through the liquid crystal layer and corresponding to ambient light is rotated to a second angle satisfying a predetermined first condition from a first angle, further the polarized light cannot pass through the polarizer so as to block emitting of reflective light formed on the light source layer by the ambient light;

when the display screen is in the second display mode, the control unit controls optical phase of the polarized light to rotate to a third angle satisfying a predetermined second condition from the first angle by the controlling the liquid crystal layer, so that an amount of emitted light passing through the polarizer is controlled at each pixel, thereby enabling the display screen to display image information based on the ambient light.

In order to better understand the above described technical solution, a detailed explanation will be made below with reference to accompanying drawings and specific embodiments.

First Embodiment

One embodiment of the present invention provides a display screen, which is not only applicable in a separate display apparatus, but also in an electronic device having an image outputting unit.

Figure 3:
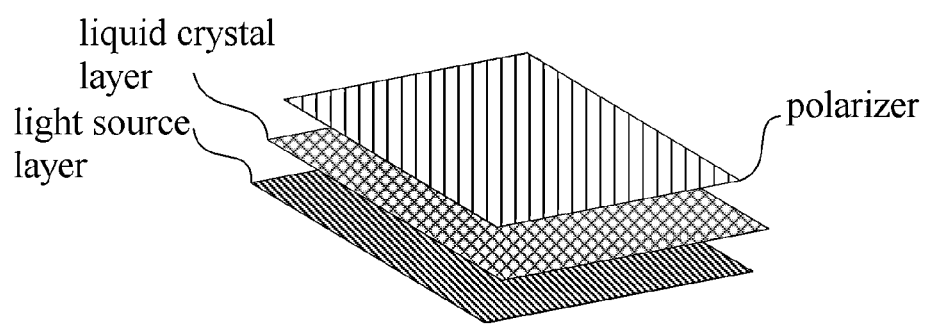
FIG. 3 is a structural schematic view of a display screen in accordance with a first embodiment of the present application.

As shown in FIG. 3, the display screen includes as follows:

a light source layer, configured to be in an "on" state for providing a display light source corresponding to a first display mode, when the display screen is in the first display mode, and to be in an "off" state when the display screen is in a second display mode different from the first display mode;

a liquid crystal layer, disposed in front of the light source layer;

a polarizer, disposed in front of the liquid crystal layer;

a control unit (not shown), in connection with the liquid crystal layer and configured to control the liquid crystal layer;

wherein when the display screen is in the first display mode, the liquid crystal layer is controlled by the control unit so that optical phase of polarized light passing through the liquid crystal layer and corresponding to the ambient light is rotated to a second angle satisfying a predetermined first condition from a first angle, further the polarized light cannot pass through the polarizer so as to block emitting of reflective light formed on the light source layer by the ambient light;

when the display screen is in the second display mode, the control unit controls optical phase of the polarized light to rotate to a third angle satisfying a predetermined second condition from the first angle by the controlling the liquid crystal layer, so that an amount of emitted light passing through the polarizer is controlled at each pixel, thereby enabling the display screen to display image information based on the ambient light.

Therefore, the above described display screen having such design can achieve display of image information based on different display light sources, by means of controlling the liquid crystal layer by the control unit.

Second Embodiment

Figure 4:
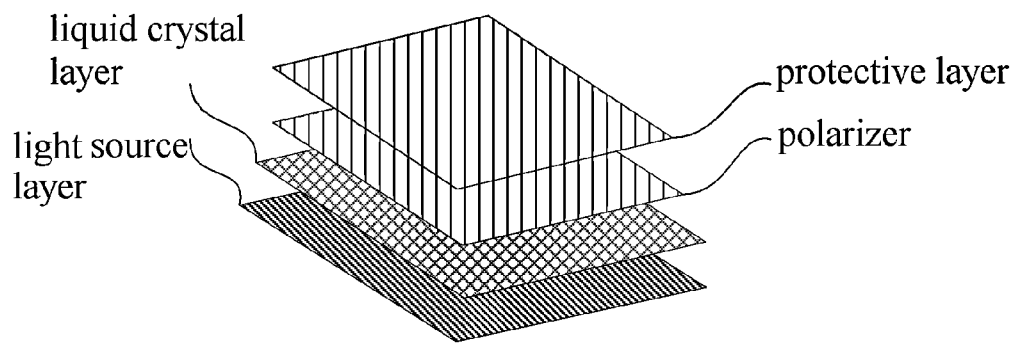
FIG. 4 is a structural schematic view of a display screen in accordance with a second embodiment of the present application.

In an embodiment, the display screen further includes a protective layer, disposed in front of the polarizer (above the polarizer in FIG. 4). With reference to FIG. 4, such protective layer is used to protect the polarizer. As one embodiment, the protective layer is made of materials having high transparency, to ensure the displaying effect.

During the specific embodiment, the light source layer can be OLED, having self luminous characteristic. OLED is structurally composed of a substrate, an anode, a conductive layer, an emitting layer and a metal cathode in order. But since the metal cathode formed on an upper layer of the OLED has a very high reflectivity, it will strongly reflect the ambient light. Although the OLED light source layer is used as an example to make an explanation in the above embodiment of the present invention, the present invention is not limited to this, for example, the light source layer can also be DMS.

Further, in order to solve the technical problem that the metal cathode of the OLED strongly reflects the ambient light, one embodiment of the present application provides a combining structure made of a liquid crystal layer and a control unit for controlling the same, disposed in front of the OLED. Specifically, the control unit for controlling the liquid crystal layer is a semiconductor switching device, which is integrated behind the liquid crystal layer, to change driving voltage of the liquid crystal layer, so as to control optical rotation states of liquid crystal at N pixels within the liquid crystal layer, wherein N is an integer equal to or larger than 1, being the number of the liquid crystal pixel points in the liquid crystal layer.

Specifically, for example, the semiconductor switching device can be TFT (thin film field effect transistors), or other suitable semiconductor switching devices. The specific embodiment is to integrate the TFT behind each liquid pixel point of the liquid crystal layer, so as to control each liquid crystal pixel point. Then a large scale integrated circuit consisting of a plurality of TFTs can control each liquid crystal pixel point of the liquid crystal layer.

Embodiment of the display screen to achieve a first display mode and a second display mode will be described in detail below, taking into account the control unit being TFT and the electronic device of the display screen being a flat panel computer as an example.

During application of the electronic device, the display screen would specifically determine which display mode to be selected from the following two display modes, for displaying the image information of the electronic device.

A first embodiment is: to switch the display mode of the display screen from a first display mode to a second display mode based on a switching operation of the user, i.e., from a state that the OLED self emits light to display the image information to a state that the ambient light provide a display light source to display the image information; or to switch the display mode of the display screen from a second display mode to a first display mode based on a switching operation of the user, i.e., from a state that the ambient light provide a display light source to display the image information to a state that the OLED self emits light to display the image information.

A second embodiment is: to determine the display mode of the display screen from display information on the electronic device. Specifically, for example, when the electronic device is intended to display files such as electronic books, word or PDF formatted files, the display mode of the display screen will be automatically set to a second display mode, i.e., to display image information such as electronic books, word, PDF or the like, based on the ambient light. When the electronic device is intended to display files such as videos, images or the like, the display mode of the display screen is automatically set to a first display mode, i.e., to display the image information based on the light emitted by the OLED itself. In accordance with the second embodiment, the display mode will be automatically switched based on the files, that is, to display the files by the light emitted from the OLED when there is a need to display with high performance; whereas to display the files on basis of the ambient light when there is no need to display with high performance. In this way, power consumption is reduced.

Further, provided that the image information currently displayed by the electronic device is video files, a display process for displaying the video files in the first display mode by the display screen of the present embodiment will be described in detail below.

Figure 5:
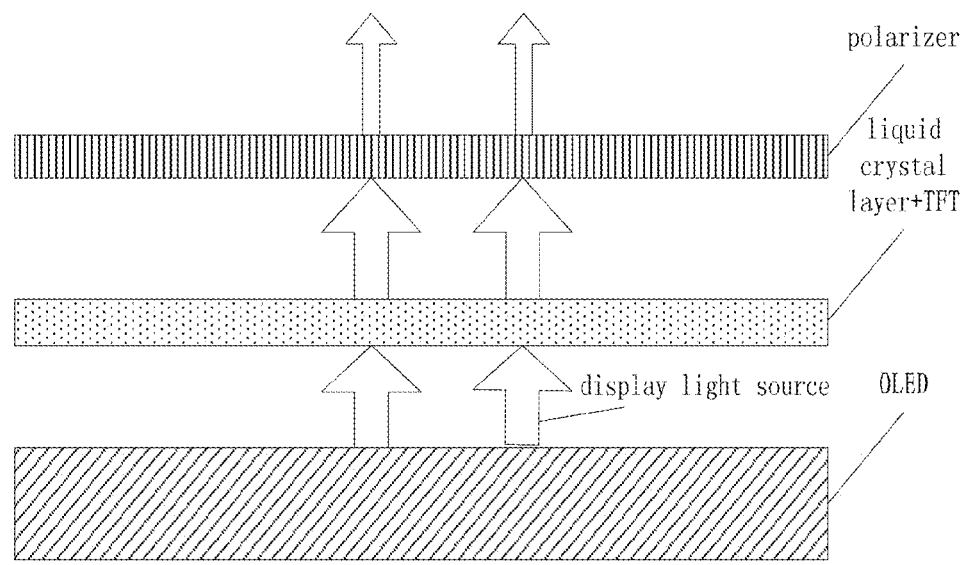
FIG. 5 is a schematic view for display on the display screen in a first display mode of the second embodiment of the present application.
Figure 6:
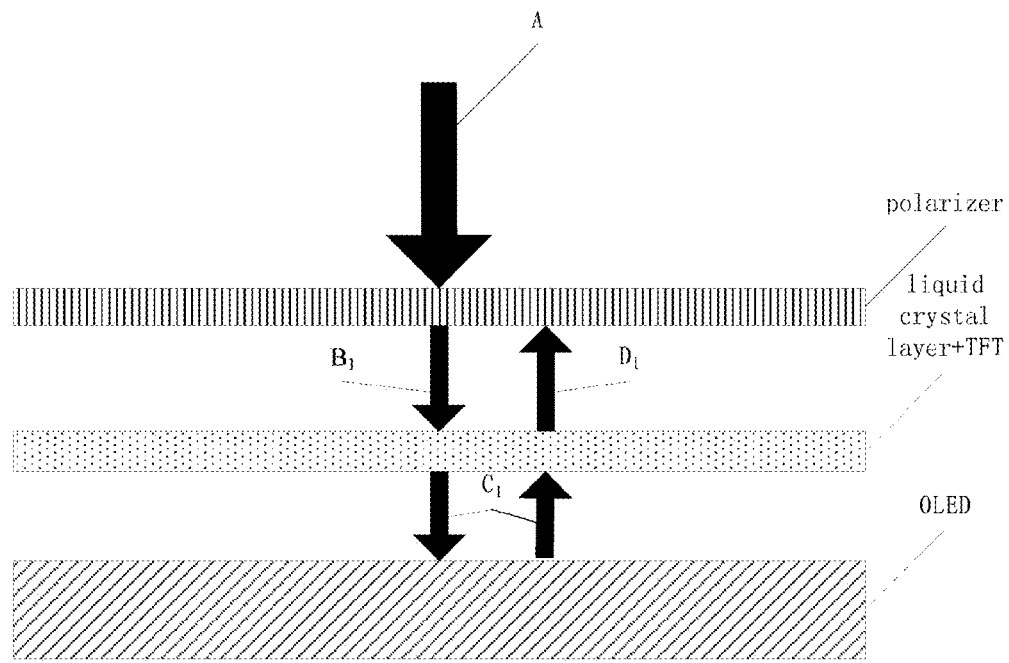
FIG. 6 is a schematic view of blocking ambient light by the display screen in a first display mode of the second embodiment of the present application.
Figure 7:
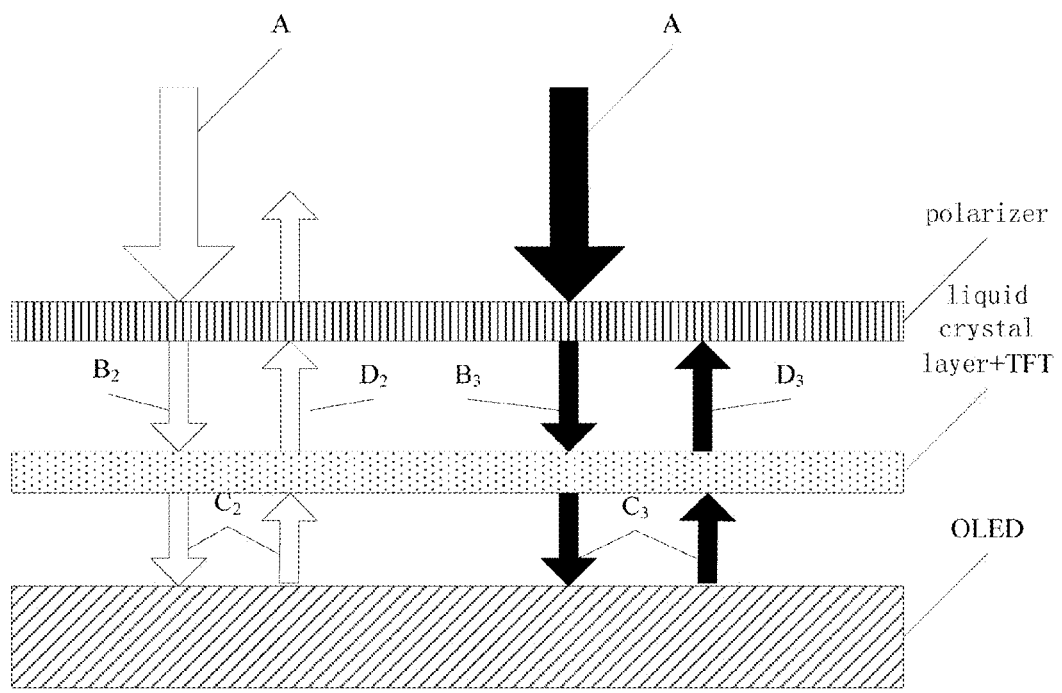
FIG. 7 is a schematic view for display on the display screen in a second display mode of the second embodiment of the present application.

Specifically, in the first display mode, the display screen obtains a video signal indicating what the electronic device needs to display. Under an appropriate voltage, anode holes and cathode charges of the OLED will be combined in the light emitting layer thereof, so as to generate light illumination. The OLED will generate RGB three primary colors depending on different recipes, which constitute basic colors. The video signal is converted into light information corresponding to the image signal by means of light emitting from the OLED. As shown in FIG. 5, the light information generated by the self-emitting light from the OLED passes through the liquid crystal layer, and then passes through the polarizer to exit, so as to provide the image information for the user. Meanwhile, as shown in FIG. 6, the ambient light A passes through the polarizer from the top thereof and then becomes polarized light $B_1$. After that, the polarized light $B_1$ enters the liquid crystal layer from the top thereof, and the TFT changes the optical rotation state of the liquid crystal layer by changing the driving voltage thereof, so that the optical phase of the polarized light $B_1$ rotates by 45° after passing the liquid crystal layer, to form a polarized light $C_1$. Thereafter, after being reflected by the metal cathode of the OLED, the polarized light $C_1$ again passes through the liquid crystal layer, and the optical phase thereof rotates by 45° to form a polarized light $D_1$. Therefore, at each pixel, the polarized light $B_1$ is changed into the polarized light $D_1$, and accordingly the optical phase thereof is rotated by 90° from the first angle to the second angle. Because the second angle of the polarized light $D_1$ is perpendicular to the transmittance axis of the polarizer, the polarized light $D_1$ cannot exit from the polarizer. Further, the reflection to the ambient light is prevented or blocked. Of course, in specific embodiment, the second angle of the polarized light can also be set to be at other predetermined angles with respect to the transmittance axis of the polarizer, in order to reduce the reflection to the ambient light. Therefore, it is possible in the first display mode to block the reflection of the ambient light on the display screen.

In addition, provided that the currently displayed image information by the electronic device is an electronic book, a display process for displaying the electronic book in the second display mode by the display screen of the present embodiment will be described in detail below.

Specifically, when the display screen is in the first display mode, the OLED is turned off. The display screen obtains literal information that the electronic device needs to display. A third angle of each liquid crystal corresponding to the literal information can be determined on basis of the literal information needed to be displayed. In an example, a third angle of $n^{th}$ pixel in the liquid crystal layer corresponds with the image information displayed by the $n^{th}$ pixel. For example, if a first pixel point is displayed as "white colour" of a page, then the ambient light A is controlled by the control of a first pixel liquid crystal corresponding to the first pixel point by the TFT such that the ambient light A forms a polarized light $B_2$ after passing through the polarizer, the polarizer light $B_2$ forms a third polarized light $C_2$ by rotating the optical phase thereof by 90° after passing through the first pixel liquid crystal, after being reflected onto the metal cathode of the OLED to be turned off, such polarized light $C_2$ again passes through the first pixel liquid crystal so that the optical phase thereof is rotated by 90° and forms a polarizer light $D_2$. At this time, the polarized light $B_2$ at the first pixel point is changed into the polarized light $D_2$, and the optical phase is rotated to a third angle by 180° from the first angle, and thus is parallel to the transmittance axis. Therefore, the polarized light $D_2$ at the first pixel point is capable of exiting from the polarizer, and displays the white colour of the page. Alternatively, a method to enable the pixel point to display the white colour is as follows: the polarized light is controlled by the controlling the first pixel liquid crystal corresponding to the first pixel point by the TFT such that it twice passes through the pixel liquid crystal and forms another polarized light which has the same optical phase as the former. As a result, the polarized light at the first pixel point exits and exhibits the white colour. Moreover, assuming that the second pixel point is displayed as a "black colour" for characters, the ambient light A forms a polarized light $B_3$ after passing through the polarizer, and then under the control to a second pixel liquid crystal corresponding to the second pixel point by the TFT, the polarized light $B_3$ forms a polarized light $C_3$ by rotating the optical phase by 45° after passing through the second pixel liquid crystal; the polarized light $C_3$ forms a polarized light $D_3$ after being reflected on the metal cathode of the OLED in off state and passing through the second pixel liquid crystal at the second time. At this time, the polarized light $B_3$ at the first pixel point becomes the polarized light $D_3$, and the optical phase thereof is rotated to a third angle by 90° from the first angle, which is perpendicular to the transmittance axis, so that the polarized light $D_3$ at the second pixel point cannot exit from the polarizer. Consequently, the second pixel point displays the "black colour". In accordance with the display method for the black colour and the white colour, the display screen can display the literal information corresponding to the electronic book.

In the specific embodiment, the skilled person in the art readily knows the embodiment of a first display mode and a second display mode when the light source layer is DMS, upon understanding or the disclosure of the case that the light source layer is OLED, as described above. For purpose of brevity, detailed description of it is omitted herein.

Another embodiment of the present application provides an electronic device, including the following components:
  a housing;
  a circuit board, disposed within the housing;
  a display screen, provided in the housing, the display screen includes:
    a light source layer, configured to be in an "on" state for providing a display light source corresponding to a first display mode, when the display screen is in the first display mode, and to be in an "off" state when the display screen is in a second display mode different from the first display mode;
    a liquid crystal layer, disposed onto the light source layer;
    a polarizer, disposed onto the liquid crystal layer;
    a control unit, in connection with the liquid crystal layer and configured to control the liquid crystal layer;
    wherein when the display screen is in the first display mode, the liquid crystal layer is controlled by the control unit so that optical phase of polarized light passing through the liquid crystal layer and corresponding to ambient light is rotated to a second angle satisfying a predetermined first condition from a first angle, further the polarized light cannot pass through the polarizer so as to block emitting of reflective light formed on the light source layer by the ambient light;
    when the display screen is in the second display mode, the control unit controls optical phase of the polarized light to rotate to a third angle satisfying a predetermined second condition from the first angle by the controlling the liquid crystal layer, so that an amount of emitted light passing through the polarizer is controlled at each pixel, thereby enabling the display screen to display image information based on the ambient light.

The main structures of the electronic device are briefly discussed above, but specific structures of the display screen and variations thereof are omitted herein, and please refer to the corresponding description with respect to those in the above described embodiment.

The technical solutions of the above described embodiment of the present application at least have the following technical effects or advantages:

1. Because a liquid crystal layer and a control unit for controlling the liquid crystal layer are provided in the display screen, the following technical solution can be employed herein: in the first display mode, the liquid crystal layer is controlled by the control unit such that the optical phase of the polarized light corresponding to the ambient light and passing through the liquid crystal layer is rotated to a second angle satisfying a predetermined first condition from a first angle; and in the second display mode, the liquid crystal layer is controlled by the control unit such that the optical phase of the polarized light corresponding to the ambient light and passing through the liquid crystal layer is rotated to a third angle satisfying a predetermined second condition from the first angle. That is, the display screen is able to: when in the first display mode a display light source provided by the light source layer displays the image information, to rotate the optical phase of the polarized light corresponding to the ambient light to the second angle satisfying the predetermined first condition, so that the polarized light cannot exit from the polarizer and the reflection of the ambient light is blocked upon displaying the image information based on the display light source; and meanwhile in the second display mode, in accordance with the need for displaying the image information of each pixel point, to rotate the optical phase of the polarized light corresponding to the ambient light to the third angle satisfying the predetermined second condition, for example, a certain pixel point needs to display the black colour, the control unit controls the optical rotation state of the pixel liquid crystal corresponding with such pixel point to enable the optical phase of the polarized light which has twice passed through this pixel liquid crystal, to change by 90° (i.e., perpendicular to the transmittance axis of the polarizer), and consequently, the pixel point displays the black colour. As such, it is possible to make the optical phase of the polarized light having passed through one certain pixel liquid crystal not be rotated or be rotated by 180°, so as to be in parallel with the transmittance axis of the polarizer. In this way, the pixel point displays the white colour. Therefore, this way effectively solves the technical problem that it is only possible to provide the display light source by the light source layer to display the image information in the prior art, instead of providing the image information based on the ambient light. Further, the following technical effect is achieved: to display the image information based on the transmittance of the display light source in the first display mode, and to display the image information based on the reflection of the ambient light.

2. With the liquid crystal layer and the control unit for controlling the liquid crystal layer and controlling the optical rotation state of the liquid crystal layer by the control unit to rotate the optical phase of the polarized light corresponding to the ambient light by 90°, the wavelengths of the ambient light vary in a predetermined range, thus the optical rotation states of the liquid crystal layer will vary under the control of the control unit, so that the optical phases of the polarized light having different wavelengths and corresponding to the ambient light all are perpendicular to the transmittance axis of the polarizer. Therefore, this effectively solves the non-consistency of the rotational angles of the optical phases with respect to the ambient light having different wavelengths in the prior art, and it also avoids poor effect of blocking the reflection of some wavelengths of the ambient light. Further it achieves the technical effects of consistently blocking to any ambient light and improving visibility under strong ambient light.

Third Embodiment

Figure 8:
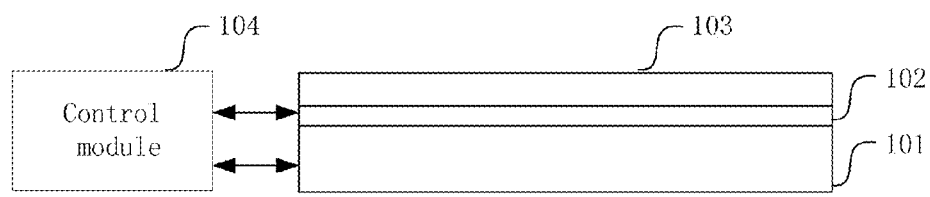
FIG. 8 is a schematic view of the display device for suppressing reflection of the ambient light in accordance with a third embodiment of the present application.

The present embodiment discloses a display device, applicable to the electronic device. As shown in FIG. 8, the display device includes a display screen 101 switchable between the transmittance mode and the reflection mode, an electronically controllable phase retarder 102, a polarizer 103 and a control module 104; wherein the display screen 101 switchable between the transmittance mode and the reflection mode is used to display in a transmittance mode or a reflection mode;

the electronically controllable phase retarder 102 is located on the display screen 101 switchable between the transmittance mode and the reflection mode, and a power terminal thereof is provided to be connected with a power supply;

the polarizer 103 is located on the electronically controllable phase retarder 102;

the control module 104 respectively is connected with the display screen 101 switchable between the transmittance mode and the reflection mode, and the electronically controllable phase retarder 102, when the display screen 101 switchable between the transmittance mode and the reflection mode is operating in the transmittance mode, the input voltage of the electronically controllable phase retarder 102 is controlled to be a first voltage, while when the display screen 101 switchable between the transmittance mode and the reflection mode is operating in the reflection mode, the input voltage of the electronically controllable phase retarder 102 is controlled to be a second voltage.

The present embodiment is particularly applicable to the display screen switchable between the transmittance mode and the reflection mode, for example MEMS (Micro-Electro-Mechanical Systems) display screen and new future display screen or the like, but also is applicable to any transmittance display screen.

The electronically controllable phase retarder as described above is made of crystal capable of generating electro-optic effect, for example, such electronically controllable phase retarder may be made of liquid crystal materials, or some other crystals for generating electro-optic effect, such as ammonium dihydrogen phosphate, potassium dihydrogen phosphate, barium niobate or the like.

The function of the above polarizer is to convert the ambient light into the linearly polarized light; the main function of the electronically controllable phase retarder is to change the polarized state of the linearly polarized light, in order to suppress the reflection of the ambient light, when the display screen switchable between the transmittance mode and the reflection mode is operating in the transmittance mode; and not to affect any reflections of the ambient light, when the display screen switchable between the transmittance mode and the reflection mode is operating in the reflection mode. Specifically, when the input voltage of the electronically controllable phase retarder is at the first voltage, it operates in a quarter wavelength phase retarding mode, i.e., to convert the linearly polarized light into the circularly polarized light in a direction toward the display screen switchable between the transmittance mode and the reflection mode, and to convert the circularly polarized light into the linearly polarized light in a direction toward the polarizer. When the input voltage of the electronically controllable phase retarder is at the second voltage, it operates in a non phase retarding mode.

Fourth Embodiment

Figure 9:
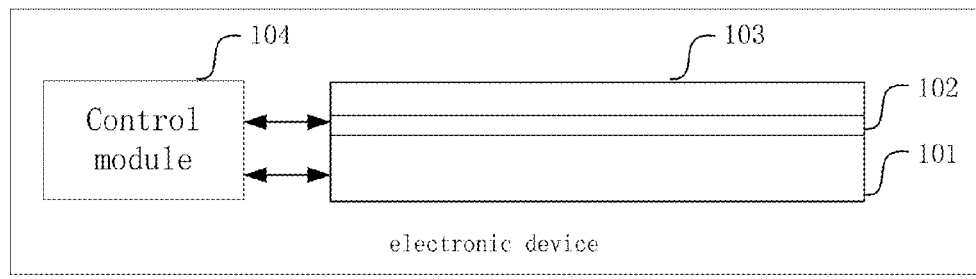
FIG. 9 is a schematic view of an electronic device in accordance with a fourth embodiment of the present application.

The present embodiment provides an electronic device. As shown in FIG. 9, such electronic device includes the display device as described in the first embodiment.

Such electronic device is a kind of mobile internet device, for example, smart phone, tablet computer, notebook computer or the like.

Figure 10A:
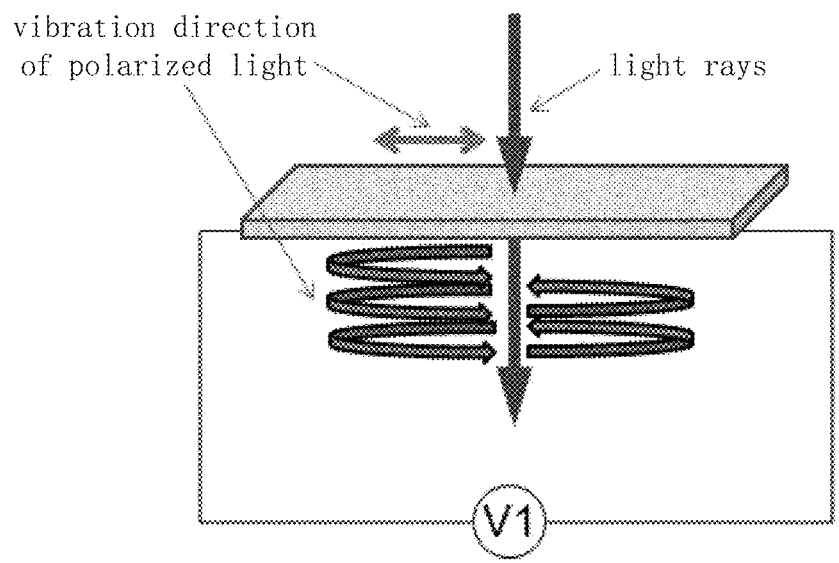
FIG. 10a is a working principle diagram of an electronically controlled phase retarder in mode 1.
Figure 10B:
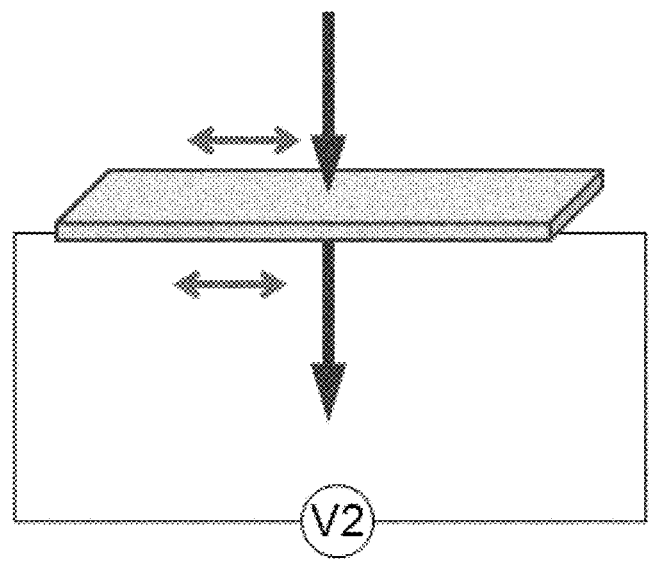
FIG. 10b is a working principle diagram of an electronically controlled phase retarder in mode 2.

The working principle of the electronically controllable phase retarder will be discussed below, which has two working modes:

Mode 1, when a voltage V1 is applied to the electronically controllable phase retarder, it operates in the quarter wavelength phase retarding mode, so that the linearly polarized light is converted into the circularly polarized light by the electronically controllable phase retarder, as shown in FIG. 10a;

Mode 2, when a voltage V2 is applied to the electronically controllable phase retarder, it will maintain the polarized state of the linearly polarized light, that is, such retarder can be regarded as one piece of transparent diaphragm, without affecting the light, as shown in FIG. 10b.

Figure 11:
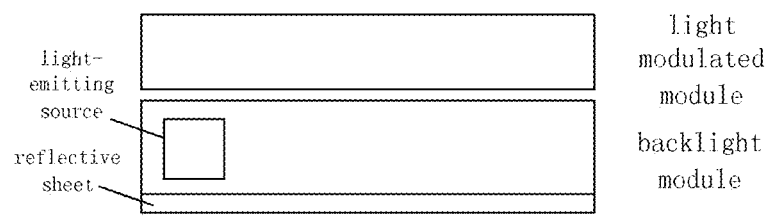
FIG. 11 is a structural schematic view of a display screen switchable between transmission and reflection modes.

The working principle of the display screen switchable between the transmittance mode and the reflection mode will be explained below. The display screen switchable between the transmittance mode and the reflection mode includes a light modulated module and a backlight module, as shown in FIG. 11. More particularly, the light modulated module can be louver-type MEMS structure or the liquid crystal module. Such backlight module includes a light-emitting source and a reflective sheet. The light-emitting source is for example LED (light-emitting diode), and the reflective sheet is located at the lowest layer of the backlight module. If the backlight module does not have the light-emitting source, it is possible to have a light emitting source outside of the backlight module. In other words, whether the light emitting source is disposed in the backlight module or outside of the backlight module does not affect the functionality.

Figure 12A:
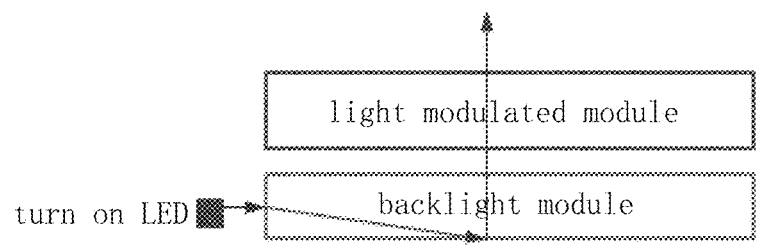
FIG. 12a is a working principle diagram of a display screen switchable between transmission and reflection modes being in a transmission mode.
Figure 12B:
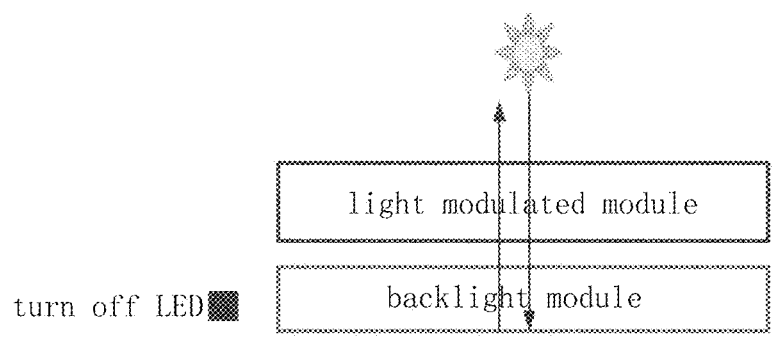
FIG. 12b is a working principle diagram of a display screen switchable between transmission and reflection modes being in a reflection mode.

In an example that the LED is the light emitting source, the LED lamp is lighten up in the transmittance mode. At this time, the light emitted from the LED lamp enters the backlight module from the bottom, and exits from the top of the light-modulated module. This is in principle similar to the existing LCD (liquid crystal display), as shown in FIG. 12a. In the reflection mode, the LED lamp is turned off. At this time, the outside ambient light pass through the light modulated module from the top and are incident toward the backlight module. Since the reflective sheet is at the lowest layer of the backlight module, the outside ambient light is reflected away from the reflective sheet. In this case, the outside ambient light is used as the light source, as shown in FIG. 12b.

The working principle of the display device as described in the third embodiment will be briefly explained below.

Figure 13:
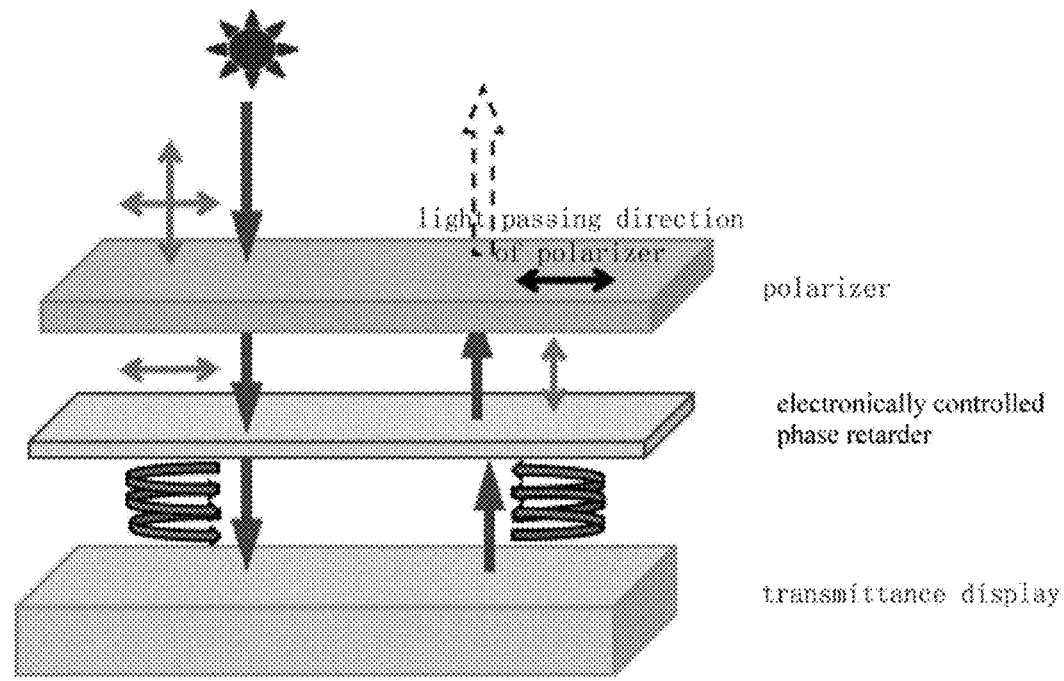
FIG. 13 is a working principle diagram of a display device in the transmission mode in accordance with a sixth embodiment of the present application.

As shown in FIG. 13, when the display screen switchable between the transmittance mode and the reflection mode is operating in the transmittance mode, the user does not desire the screen is subjected to the disturbance of the ambient light, and then the control module applies a voltage V1 onto the electronically controlled phase retarder, so that it operates in a quarter wavelength phase retarding mode. In this case, the outside ambient light become the linearly polarized light (which are assumed to be linearly polarized light in the horizontal direction) after passing through the outermost polarizer, the linearly polarized light is converted into the circularly polarized light (which are assumed to be right handed circularly polarized light) by the electronically controlled phase retarder. After being reflected by the display screen, the light is converted into left handed circularly polarized light, and is converted into the linearly polarized light in the perpendicular direction after passing through the electronically controlled phase retarder again. The resulting linearly polarized light cannot exit from the polarizer. The light emitted from the display screen successfully passes through the polarizer, and thus the suppression to the reflection of the ambient light can be achieved, to effectively improve the contrast.

Figure 14:
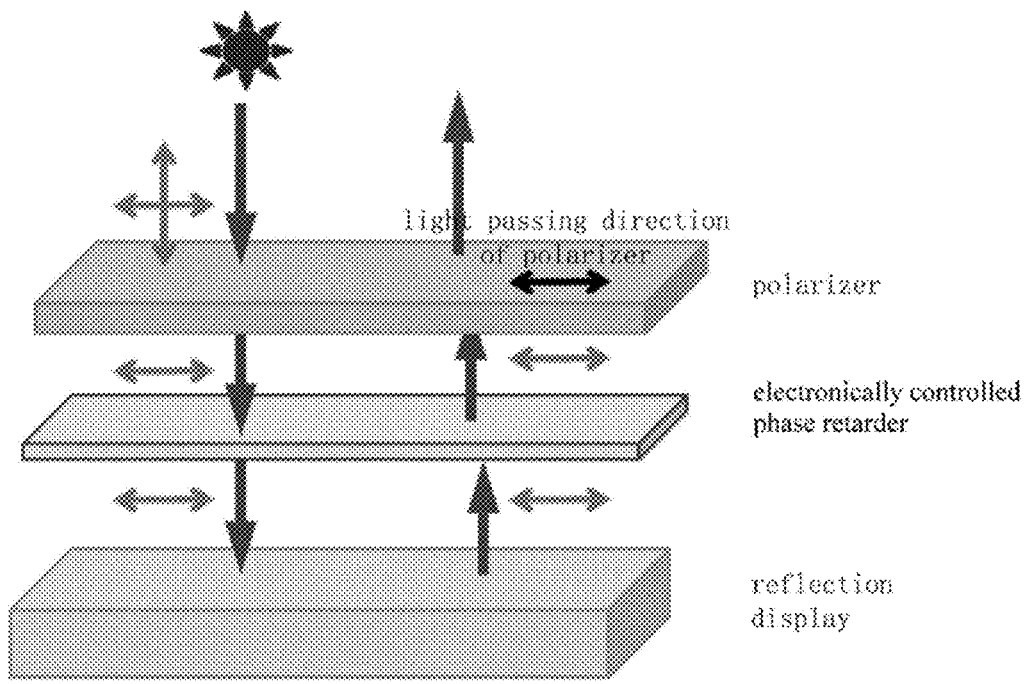
FIG. 14 is a working principle diagram of a display device in the reflection mode in accordance with a sixth embodiment of the present application.

As shown in FIG. 14, when the display screen switchable between the transmittance mode and the reflection mode is operating in the reflection mode, the display screen uses the reflection to the ambient light, and the control module applies the voltage V2 onto the electronically controlled phase retarder, so that it works in the non-phase retarding mode. At this time, the outside ambient light successfully passes through the polarizer and the electronically controlled phase retarder, and arrives at an eye of the user after being reflected by the display screen.

Fifth Embodiment

A fifth embodiment of the present invention provides a method for processing information and an electronic device, so as to solve the technical problem in the art that the ambient light would disturb the contents of the display unit. The technical solution of the fifth embodiment in accordance with the present application provides the following general concept, for solving the above described technical problem:

When the contents are being displayed on the display unit of the electronic device, the following steps are employed:
  sampling and obtaining parameter information;
  determining whether the parameter information satisfies a predetermined first condition;
  adjusting a display parameter value corresponding to the display of the display unit from a first value to a second value different from the first value, so as to enhance contrast of the display content under the ambient light where the electronic device is located, in the case that the parameter information satisfies the predetermined first condition.

With the above technical solution that when the contents are displayed on the display unit of the electronic device, the parameter information is sampled and obtained; when the parameter information satisfies the predetermined first condition, the displayed parameter information corresponding to the display of the display unit is adjusted from the first value to the second value different from the first value, further to improve the contrast of the contents under the ambient light where the electronic device is located, the technical effect of decreasing the disturbance of the ambient light to the contents of the display unit can be obtained herein.

In order to better understand the above technical solution, this will be described in detail in conjunction with the accompanying drawings and the specific embodiments below.

EXAMPLE 1

The present example provides a method for processing information, which is applicable into the electronic device. The electronic device is for example, notebook computer, tablet computer, mobile phones or the like.

Figure 15:
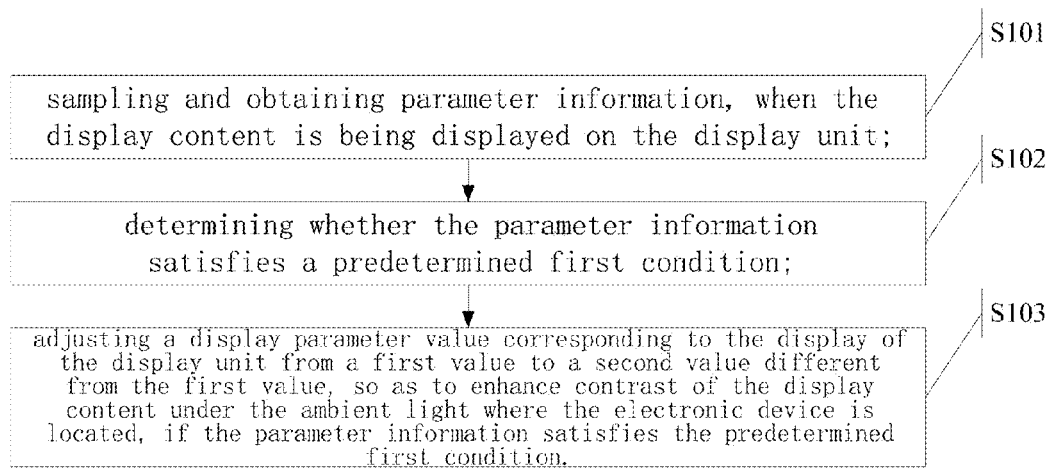
FIG. 15 is a flowchart of an information processing method in accordance with an embodiment of the present invention.

With reference to FIG. 15, the method for processing information includes the followings:

Step S101: sampling and obtaining parameter information, when the contents are being displayed on the display unit;

Step S102: determining whether the parameter information satisfies a predetermined first condition;

Step S103: adjusting a display parameter value corresponding to the display of the display unit from a first value to a second value different from the first value, so as to enhance contrast of the display content under the ambient light where the electronic device is located, if the parameter information satisfies the predetermined first condition.

Specifically, in the step S101, the parameter information can be selected from many kinds of parameters. Two of them are illustrated below, as an example. Of course, in the specifically implementing process, it is not limited to this.

A first type of the specific parameter information is behaviour features of the user to use the electronic device, which is sampled by an image sampling device built in the electronic device or an external image sampling device. Such behaviour features can be a plurality of behaviour features, for example, the behaviour feature of shading a forehead of the user by his hand, or shading the display unit by his hand, or the like.

It can be known from the above description that the technical effect of precisely adjusting the displayed parameter value is obtained, since the parameter information of the present example includes: the behaviour features of the user of the electronic device, and in turn it is determined from the behaviour features on whether it is needed to adjust the displayed parameter values; and further the behaviours of the user can accurately indicate the disturbance degree of the ambient light to the contents. Moreover, this will better satisfy the needs of the user, and further improve user's experience.

A second type of the parameter information includes: parameter values of the ambient light of the electronic device, sampled by a light illumination sensor.

Particularly, due to the difference of the parameter information detected and obtained by the step S101, the step S102 for determining whether the parameter information satisfies the predetermined first condition will also become various. Two of them are exemplified below as examples. Of course, in the specific implementing process, it is not necessary to be this case.

In the first situation, when the parameter information is in particular the behaviour features, the step of determining the parameter information whether satisfies the predetermined first condition includes:

determining whether the behaviour features indicate light illumination intensity corresponding to the ambient light larger than a threshold value of the light illumination intensity for the user.

To be more specific, it is possible to determine whether the light illumination intensity of the ambient light has already gone beyond an acceptable range of the user based on analysis on the behaviour features. Accordingly, the user has to take the corresponding behaviour features so as to reduce influence of the light illumination intensity to the display unit.

In the specific embodiment, whether the light illumination intensity is larger than the threshold value of the light illumination intensity for the user, can be characterized by the behaviour features in many cases. Two of them will be discussed below. Of course, in the specific embodiment, it is not limited to the following two cases.

(1) The step of determining whether the behaviour features indicate the light illumination intensity corresponding to the ambient light is larger than the threshold value of the light illumination intensity for the user includes:

determining whether the behaviour features indicate a first shading object and the user head satisfies a predetermined first relationship.

In one specific embodiment, when the light illumination intensity is too large, the user maybe uses the first shading object (for example, a hand, a book or the like) to shade the forehead of the user, so as to further decrease the light illumination intensity illuminated on the display unit. Therefore, a positional relationship between the user and the first shading object is sampled by the image sampling device built in or externally connected with the electronic device. Further, whether the light illumination intensity is larger than the threshold value of the light illumination intensity, can be determined on basis of whether the relationship between the first shading object and the user head satisfies the predetermined first relationship, wherein the predetermined first relationship is for example a distance of the first shading object from the head being less than a predetermined distance threshold value, the first shading object in contact with the head, or an angle between the first shading object and the head within a predetermined angular range, for example, 60°-120°. Of course, it can also be within other angular ranges, and this is not limited by the present example of the present application.

(2) The process of determining whether the behaviour features indicate the light illumination intensity corresponding to the ambient light is larger than the threshold value of the light illumination intensity for the user includes:

determining whether the behaviour features indicate there is a predetermined second relationship between a second shading object and the display unit.

In one specific implantation, when the user feels the light illumination intensity is larger than the threshold value of the light illumination intensity, it is also possible to use the second shading object to shade the display unit. The second shading object can be for example, a hand of the user, a book text or the like. Therefore, whether the light illumination intensity is larger than the threshold value of the light illumination intensity can be determined by whether a predetermined relationship is satisfied between the second shading object and the display unit. In an embodiment, whether the second predetermined condition to be met, can be determined by the positional relationship between the second shading object and the display unit sampled by the image sampling device built in or externally connected with the electronic device. Alternatively, when the display unit is a touch controllable display unit, whether the predetermined second relationship to be satisfied between the second shading object and the display unit, can be determined by whether there is a predetermined touch area between the touch controllable display unit and the second shading object. In the embodiment, the present example does not make any limitation to which one of the methods to be adopted, so as to determine whether the behaviour features indicate there is a second relationship between the second shading object and the display unit.

It can be known from the above that in the present example, when determining whether the behaviour features satisfy the predetermined first condition, it mainly determines whether the behaviour features indicate the light illumination intensity corresponding to the ambient light is larger than the threshold value of the light illumination intensity for the user, wherein such step of determining whether the behaviour features indicate the light illumination intensity corresponding to the ambient light is larger than the threshold value of the light illumination intensity for the user, can be classified into a plurality of conditions, for example, to determine whether the behaviour features indicate the predetermined relationship to be met between the first shading object and the head of the user, to determine whether such behaviour features indicate the predetermined relationship to be present between the second shading object and the display unit, thereby achieving the technical effect of diversifying the means for determining whether the behaviour features satisfy the predetermined first condition.

If the behaviour features are sampled by the image sampling device in an embodiment, then the following steps can also be performed: to determine whether the image sampling device is in an image sampling state; and when the image sampling device is in the image sampling state, sampling the behaviour features by the image sampling device.

To be more specific, only when the image sampling device is in the image sampling state, for example, taking photographs, taking video chat, the behaviour features are sampled by the image sampling device. Because it does not restart the image sampling device, the present example has the technical effect of saving energy consumption.

In a second circumstance that the parameter information is in particular the ambient light parameter value, the step of determining whether the parameter information satisfies the predetermined first condition includes:

determining whether the ambient light parameter value is larger than a predetermined threshold value of the ambient light.

In the specific embodiment, the predetermined threshold value of the ambient light can be preset in the electronic device, and thus it indicates a relatively large disturbance of the ambient light to the contents, when the parameter value of the ambient light is larger than the predetermined parameter value of the ambient light. Further, the displayed parameter value is adjusted. In one specific embodiment, the predetermined threshold value of the ambient light can be a fixed value, or be adjusted in accordance with different users. As for this, the present example does not make any limitation.

In the step S103, the displayed parameter value can be classified into several types of displayed parameter values, and thus the adjustments to the displayed parameter values can be various. Two of them are listed for the illustration. Of course, it is not necessary to limit to this in the specific embodiments.

In a first case that when the display unit surface is provided with an optical unit, the displayed parameter value is in particular an optical parameter value of the optical unit. The process of adjusting the displayed parameter value from a first value to a second value different from the first value includes:

adjusting the optical parameter value from a first optical parameter value to a second optical parameter value different from the first optical parameter value.

In the specific embodiment, a first absorption capability of the optical unit to the ambient light when the optical parameter value is the second optical parameter value, is larger than a second absorption capability of the optical unit to the ambient light when the optical parameter value is the first optical parameter value; a third absorption capability of the optical unit to first light corresponding to the contents when the optical parameter value is the second parameter value, is larger than a fourth absorption capability of the optical unit to the first light when the optical parameter value is the first optical parameter value.

Although the absorption capabilities of the optical unit to the ambient light and the first light both increase when the optical parameter value is adjusted to the second optical parameter value from the first optical parameter value; relatively speaking, the absorption capability of the optical unit to the ambient light become more strong. Thus, the contrast of the contents with respect to the ambient light can be increased, and further the disturbance of the ambient light to the contents can be decreased.

Figure 16A:
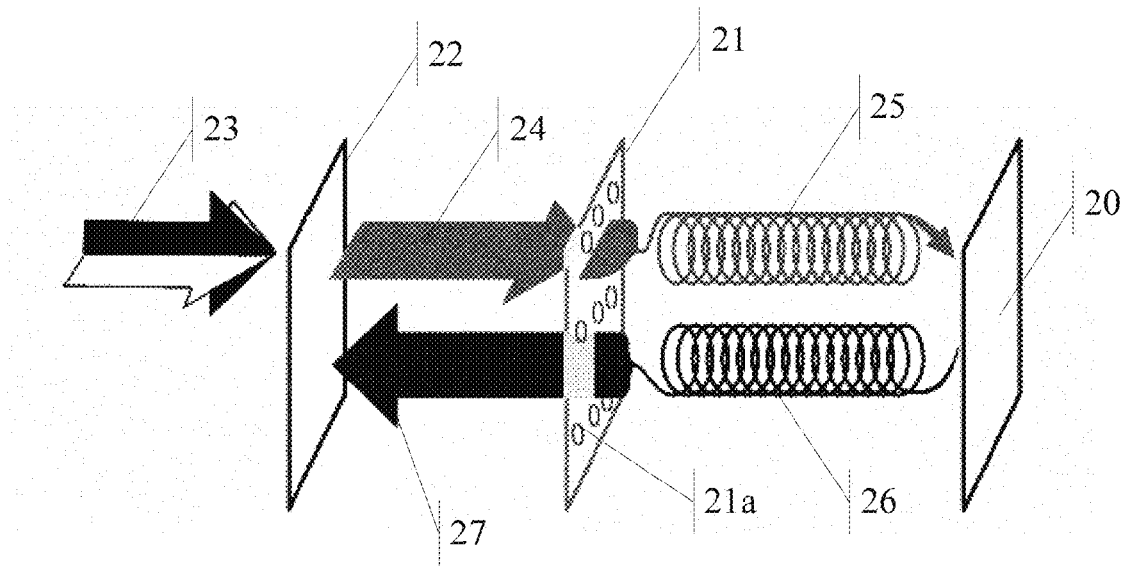
FIG. 16a is a schematic view showing positional relationship between an optical unit and a display unit in an information processing method in accordance with an embodiment of the present invention.

In an embodiment, please refer to FIG. 16a, and the optical unit specifically includes the following components:

a liquid crystal layer 21, disposed onto a surface of the display unit 20, wherein the liquid crystal layer 21 includes at least one liquid crystal particles 21a;

a linear polarizer 22, disposed onto a surface of the liquid crystal layer 21.

The process of adjusting the optical parameter value of the optical unit from the first optical parameter value to the second optical parameter value different from the first optical parameter value includes:

adjusting the at least one liquid crystal particle 21a from a first alignment to a second alignment different from the first alignment.

Figure 16B:
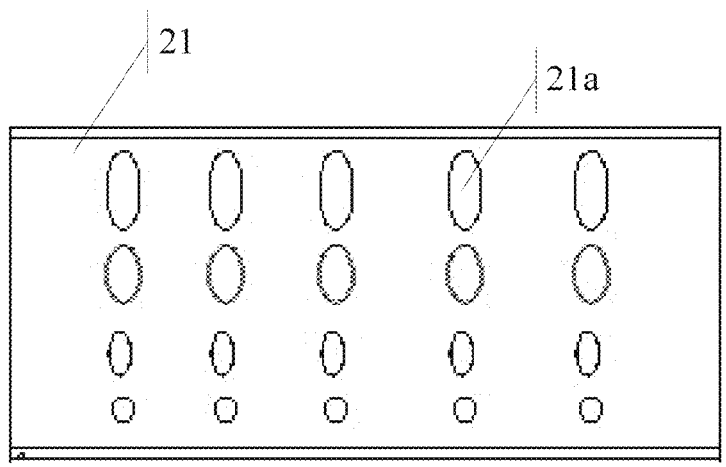
FIG. 16b is a schematic view showing at least one liquid crystal particles disposed in a first alignment in an information processing method in accordance with an embodiment of the present invention.
Figure 16C:
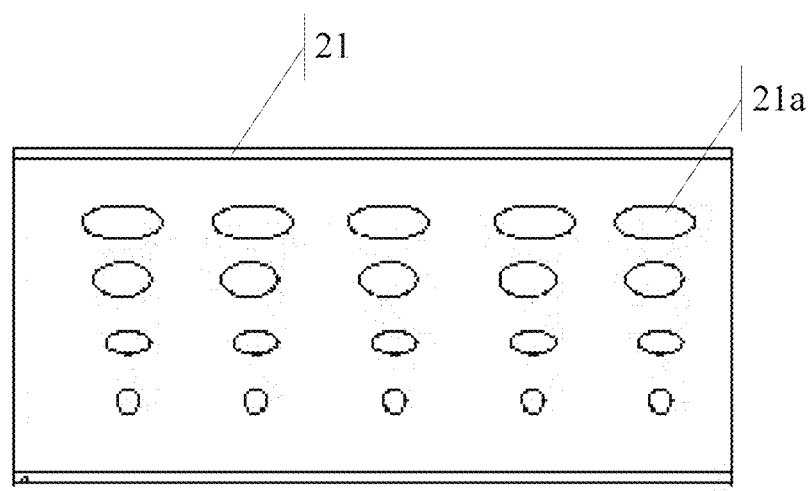
FIG. 16c is a schematic view showing at least one liquid crystal particles disposed in a second alignment in an information processing method in accordance with an embodiment of the present invention.

When the at least one liquid crystal particle 21a is in the first alignment, the absorption capability of the linear polarizer 22 to the ambient light 23 is the second absorption capability, and the absorption capability of the linear polarizer 22 to the first light is the fourth absorption capability. When the at least one liquid crystal particle 21a is in the second alignment, the absorption capability of the linear polarizer 22 to the ambient light 23 is the first absorption capability, and the absorption capability of the linear polarizer 22 to the first light is the third absorption capability. In a specific example, the first alignment is for example a longitudinal alignment of the at least one liquid crystal particle 21a, as shown in FIG. 16b; the second alignment is for example a lateral alignment of the at least one liquid crystal particle 21a, as shown in FIG. 16c.

In the specific embodiment, when the at least one liquid crystal particle 21a is in the second alignment, the linear polarizer 22 is used to absorb light of the ambient light 23 whose polarized component is parallel to the polarized direction of the linear polarizer 22, so that the ambient light 23 are converted into the first linearly polarized light 24 having a polarized direction perpendicular to the absorption direction of the linear polarizer 22. The liquid crystal layer 21 is used to convert the first linearly polarized light 24 into a first circularly polarized light 25, and the display unit 20 is used to reflect the first circularly polarized light 25 back to the liquid crystal layer 21, so as to obtain a second circularly polarized light 26. The liquid crystal layer 21 is also used to convert the second circularly polarized light 26 into a second linearly polarized light 27 having a polarized direction parallel to absorption direction of the linear polarizer 22. Also, the linear polarizer 22 is used to absorb the second linearly polarized light 27, and the display unit 20 is used to generate the first light being the third linearly polarized light. In addition, the liquid crystal layer 21 is used to convert the third linearly polarized light into the third circularly polarized light, and the linear polarizer 22 is used for absorbing the component of the third circularly polarized light having the polarized direction parallel to the absorption direction of the linear polarizer 22. When the at least one liquid crystal particle 21a is in the first alignment, the liquid crystal layer 21 cannot convert the first linearly polarized light 24 into the second linearly polarized light 27, and thus it only filter out the components of the ambient light 23 parallel to the absorption direction of the linear polarizer 22, instead of the first linearly polarized light 24, so that the second absorption capability is less than the first absorption capability. Moreover, the liquid crystal layer 21 cannot convert the third linearly polarized light into the third circularly polarized light, and the absorption direction of the linear polarizer 22 is perpendicular to the polarized direction of the third linearly polarized light, so that it does not function to absorb the third linearly polarized light. After such, the third linearly polarized light will not be absorbed by the linear polarizer 22, so that the fourth absorption capability is less than the third absorption capability.

In one specific embodiment, the process of adjusting the at least one liquid crystal particle 21a from the first alignment to the second alignment different from the first alignment, includes:

a voltage applied at two ends of the liquid crystal layer 21 is adjusted from the first voltage to the second voltage different from the first voltage, so that the at least one liquid crystal particle 21a is adjusted from the first alignment to the second alignment by the second voltage.

In the specific embodiment, when a first voltage having a voltage value larger than a predetermined value is applied at two ends of the liquid crystal layer 21, the at least one liquid crystal particle 21a is in the first alignment; and when a second voltage having a voltage value less than the predetermined value is applied at two ends of the liquid crystal layer 21, the at least one liquid crystal particle 21a is in the second alignment. The predetermined value is for example 0V. Of course, in the specific embodiment, the 0V is not necessary in an absolute sense, but also can be other values approximate to 0V, for example, 0.01V, 0.1V or the like. As for this, the present application is not limited to the above specific example.

It can be known from the above that the present example can achieve the technical effect of optically decreasing disturbance of the ambient light to the contents, since in the present example the displayed parameter value can be the optical parameter value of the optical unit provided on the surface of the display unit, and the contrast of the contents under the ambient light where the electronic device is located can be improved by adjusting the optical parameter value.

In a second case that the displayed parameter value is in particular the parameter value corresponding to the contents, based on the different parameter values of the contents, the process of adjusting the displayed parameter value from the first value to the second value different from the first value can be classified into several circumstances. Three of them are listed below for illustration. Of course, in the specific embodiment, this is not limited to these.

(1) the process of adjusting the displayed parameter value from the first value to the second value different from the first value includes:

adjusting displayed brightness value of the contents from the first brightness value to the second brightness value different from the first brightness value.

Specifically speaking, the contrast of the contents with respect to the ambient light can be improved by increasing the displayed brightness value of the contents.

(2) the process of adjusting the displayed parameter value from the first value to the second value different from the first value includes:

adjusting the contrast value of the contents from the first contrast value to the second contrast value different from the first contrast value.

Specifically speaking, the contrast of the contents with respect to the ambient light can be improved by adjusting the contrast value of the contents. Typically, in order to increase the contrast value, for example, brightness of a portion of the contents which have brightness larger than a predetermined first brightness value, is increased; whereas brightness of another portion of the contents which have brightness less than the predetermined first brightness value, is decreased.

(3) the process of adjusting the displayed parameter value from the first value to the second value different from the first value includes:

adjusting a tone value of the contents from a first tone value to a second tone value different from the first tone value.

To be more specific, the contrast of the contents to the ambient light can be improved by adjusting the tone value of the contents. Typically, saturation of the tone value of the contents is improved. Generally, the higher the saturation of the image is, the easier it is noticed by eyes of the user. Therefore, the contrast of the contents to the ambient light can be improved by increasing the saturation thereof.

Therefore, it is apparent from the above that the present example to achieve the technical effect of diversifying the means for decreasing the disturbance of the ambient light to the contents, since the contrast of the contents under the ambient light where the electronic device is located can be improved by adjusting the display brightness, the contrast or the tone of the contents.

EXAMPLE 2

In order to enable the skilled person in the art to further understand the method for processing information as discussed in the example 1 of the present application, the present example will explain the specific embodiment of the method for processing information as discussed in the example 1 of the present application, from a viewpoint of the user. The present example will be described taking the mobile phone being the electronic device as an example, and the electronic device includes a touch controllable display screen.

At the time T1, a user A unlocks the mobile phone, to perform an operation of browsing micro-blog by it.

At the time T2, the user A thinks the ambient light to be so strong that the hand of the user is used to shade the surface of the touch controllable display screen. Because the touch controllable display screen detects a contact area between the hand of the user A and the touch controllable display screen, the mobile phone determines that the behaviour features of the user A satisfy the predetermined first condition, and thus a first control instruction is generated to adjust the displayed parameter value of the mobile phone.

At the time T3, the mobile phone performs the first control instruction, to further increase the contrast of the contents on the touch controllable display screen, and reduce the disturbance of the ambient light to the touch controllable display screen.

EXAMPLE 3

In order to enable the skilled person in the art to further understand the method for processing information as discussed in the example 1 of the present application, the present example 3 will further explain the specific embodiment of the method for processing information as discussed in the example 1 of the present application, from a viewpoint of the user. The present example will be described taking the notebook computer being the electronic device as an example, and the notebook computer includes a display unit and a camera. A surface of the display unit is provided with a liquid crystal layer, which includes at least one liquid crystal particle. A linear polarizer is provided on a surface of the liquid crystal layer, and a voltage is applied at two ends of the liquid crystal layer, so that the at least one liquid crystal particle is in the lateral alignment.

At the time T4, a user B turns on the notebook computer and opens one Chat Software on the notebook computer.

At the time T5, the user B turns on the camera and then makes a video chart with a user C on the chart software. After the notebook computer detects the operation that the user B turns on the camera and makes the video chat, it samples the behaviour features of the user B.

At the time T6, the user B shades his/her forehead by a book. After the notebook computer samples the above behaviour features of the user B, it determines that the behaviour features of the user B satisfy the predetermined first condition, and a second control instruction is generated to adjust the displayed parameter value related to the display of the display unit.

At the time T7, the notebook computer performs the second control instruction, and stops applying the voltage at the two ends of the liquid crystal layer, so that the at least one liquid crystal particle is controlled to be in the longitudinal alignment, so as to activate anti-reflection function of the at least one liquid crystal particle, and have the linear polarizer and the liquid crystal layer to fully absorb the ambient light, thus reducing the disturbance of the ambient light to the contents of the display unit.

EXAMPLE 4

Figure 17:
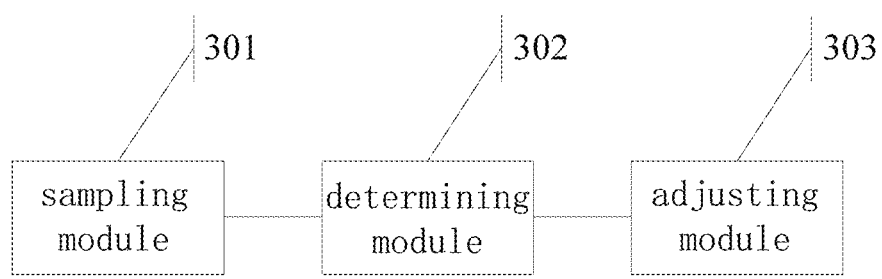
FIG. 17 is a structural diagram of an electronic device in accordance with an embodiment of the present application.

Based on the same inventive concept, the present example 4 provides an electronic device for implementing the method for processing the information in accordance with the examples 1, 2 and 3. Please refer to FIG. 17, the electronic device includes the following components:

a sampling module 301, for sampling and obtaining a parameter information, when the contents are being displayed on the display unit;

a determining module 302, for determining whether the parameter information satisfies a predetermined first condition;

an adjusting module 303, for adjusting the displayed parameter value corresponding to the display of the display unit from a first value to a second value different from the first value, so as to improve the contrast of the contents under the ambient light where the electronic device is located, when the parameter information satisfies the predetermined first condition.

In an embodiment, the parameter information sampled by the sampling module 301 can be various kinds of parameter information, for example, the behaviour features of the user which uses the electronic device, the parameter value of the ambient light in the environment where the electronic device is located, and so on.

It can be known from the above description that since the parameter information in the present example is in particular the behaviour features of the user using the electronic device, and it is determined from the behaviour features whether to adjust the displayed parameter value, as well as the behaviour of the user can accurately reflect the disturbance degree of the ambient light to the contents, the technical effects of more accurately adjusting the displayed parameter value, better satisfying the needs of the user, and further improving the experience of the user are achieved.

In the specific embodiment, the determination of the determining module 302 varies, depending on the differences of the parameter information sampled by the sampling module 301. Two of them are listed for illustration. Of course, it is not necessary in the specific embodiment.

In a first case that the parameter information is specifically the behaviour features of the user using the electronic device, the determining module 302 is used to:

determine the behaviour features indicate the light illumination intensity corresponding to the ambient light is larger than a threshold value of the light illumination intensity for the user.

The process of determining by the determining module 302 whether the behaviour features indicate the light illumination intensity corresponding to the ambient light is larger than the threshold value of the light illumination intensity for the user, can be classified into several cases. Two of them are listed for illustration. Of course, this is not necessary in the specific embodiment.

(1) the determining module 302 is specifically used to determine whether the behaviour features indicate the first shading object and the head of the user satisfy the predetermined first relationship.

(2) the determining module 302 is specifically used to determine whether the behaviour features indicate the second shading object and the display unit have a predetermined second relationship.

It can be known from the above that in the present embodiment of the present application, the determination on whether the behaviour features satisfy the predetermined first condition, is mainly to determine whether the behaviour features indicate the light illumination intensity corresponding to the ambient light is larger than the threshold value of the light illumination intensity for the user, wherein the process of determining whether the behaviour features indicate the light illumination intensity corresponding to the ambient light is larger than the threshold value of the light illumination intensity for the user, can be classified into several cases, for example, to determine whether the behaviour features indicate the first shading object and the head of the user satisfy the predetermined first relationship, to determine whether the behaviour features indicate the second shading object and the display unit have the predetermined second relationship, or the like. Therefore, the means for determining whether the behaviour features satisfy the predetermined first condition can be diversified.

In a second circumstance, the determining module 302 is in particular used to determine whether the parameter value of the ambient light is larger than a predetermined parameter threshold value of the ambient light.

In an embodiment, the displayed parameter value can be variously displayed parameter value, and further the adjusting process of the adjusting module 303 also is various. Two of them are listed for illustration. Of course, this is not necessary in the embodiment.

In a first circumstance that the displayed parameter value is in particular the optical parameter value of the optical unit, when the surface of the display unit is provided with the optical unit, the adjusting module 303 is specifically used to:

adjust the optical parameter value from the first optical parameter value to the second optical parameter value different from the first optical parameter value.

In the specific embodiment, the first absorption capability of the optical unit to the ambient light when the optical parameter value is the second optical parameter value, is larger than the second absorption capability of the optical unit to the ambient light when the optical parameter value is the first optical parameter value; and the third absorption capability of the optical unit to the first light corresponding to the contents when the optical parameter value is the second optical parameter value, is larger than the fourth absorption capability of the optical unit to the first light when the optical parameter value is the first optical parameter value.

In the specific embodiment, please continuously refer to FIG. 16a, when the optical unit specifically includes a liquid crystal layer 21 provided on a surface of the display unit 20 and including at least one liquid crystal particle 21a; and a linear polarizer 22 provided on a surface of the liquid crystal layer 21, the adjusting module 303 is in particular to adjust the at least one liquid crystal particle 21a from the first alignment to the second alignment different from the first alignment.

Specifically, when the at least one liquid crystal particle 21a is in the first alignment, the absorption capability of the linear polarizer 22 to the ambient light 23 is the second absorption capability, and the absorption capability of the linear polarizer 22 to the first light is the fourth absorption capability. When the at least one liquid crystal particle 21a is in the second alignment, the absorption capability of the linear polarizer 22 to the ambient light 23 is the first absorption capability, and the absorption capability of the linear polarizer 22 to the first light is the third absorption capability.

In an embodiment, when the at least one liquid crystal particle 21a is in the second alignment, the linear polarizer 22 is used to absorb light of the ambient light 23 whose polarized component is parallel to the polarized direction of the linear polarizer 22, so that the ambient light 23 are converted into the first linearly polarized light 24 having a polarized direction perpendicular to the absorption direction of the linear polarizer 22. The liquid crystal layer 21 is used to convert the first linearly polarized light 24 into a first circularly polarized light 25, and the display unit 20 is used to reflect the first circularly polarized light 25 back to the liquid crystal layer 21, so as to obtain a second circularly polarized light 26. The liquid crystal layer 21 is also used to convert the second circularly polarized light 26 into a second linearly polarized light 27 having a polarized direction parallel to absorption direction of the linear polarizer 22. Also, the linear polarizer 22 is used to absorb the second linearly polarized light 27, and the display unit 20 is used to generate the first light being the third linearly polarized light. In addition, the liquid crystal layer 21 is used to convert the third linearly polarized light into the third circularly polarized light, and the linear polarizer 22 is used for absorbing the component of the third circularly polarized light having a polarized direction parallel to the absorption direction of the linear polarizer 22. When the at least one liquid crystal particle 21a is in the first alignment, the liquid crystal layer 21 cannot convert the first linearly polarized light 24 into the second linearly polarized light 27, and thus it only filters out the components of the ambient light 23 parallel to the absorption direction of the linear polarizer 22, instead of the first linearly polarized light 24, so that the second absorption capability is less than the first absorption capability. Moreover, the liquid crystal layer 21 cannot convert the third linearly polarized light into the third circularly polarized light, and the absorption direction of the linear polarizer 22 is perpendicular to the polarized direction of the third linearly polarized light, so that it does not function to absorb the third linearly polarized light. After such, the third linearly polarized light will not be absorbed by the linear polarizer 22, so that the fourth absorption capability is less than the third absorption capability.

In one specific embodiment, the adjusting module 303 is in particular used:

to adjust a voltage applied at two ends of the liquid crystal layer 21 from the first voltage to the second voltage different from the first voltage, so that the at least one liquid crystal particle 21a is adjusted from the first alignment to the second alignment by the second voltage.

In the specific embodiment, when a first voltage having a voltage value larger than a predetermined value is applied at two ends of the liquid crystal layer 21, the at least one liquid crystal particle 21a is in the first alignment; and when a second voltage having a voltage value less than the predetermined value is applied at two ends of the liquid crystal layer 21, the at least one liquid crystal particle 21a is in the second alignment. The predetermined value is for example 0V. Of course, in the specific embodiment, the 0V is not necessary in an absolute sense, but also can be other values approximate to 0V, for example, 0.01V, 0.1V or the like. As for this, the present application is not limited to the above specific example.

It can be known from the above that the present example can achieve the technical effect of optically decreasing disturbance of the ambient light to the contents, since in the present example the displayed parameter value can be the optical parameter value of the optical unit provided on the surface of the display unit, and the contrast of the contents under the ambient light where the electronic device is located can be improved by adjusting the optical parameter value.

In a second circumstance, the adjusting module 303 is in particular used to:

adjust the displayed brightness value of the contents from the first brightness value to the second brightness value different from the first brightness value; or adjust the contrast value of the contents from the first contrast value to the second contrast value different from the first contrast value; or adjust the tone value of the contents from the first tone value to the second tone value different from the first tone value.

Therefore, it can be apparent from the above that the present example achieves the technical effect of diversifying the means for decreasing the disturbance of the ambient light to the contents, since the contrast of the contents under the ambient light where the electronic device is located can be improved by adjusting the display brightness, the contrast or the tone of the contents.

Since the electronic device in accordance with the fourth embodiment of the present application is the electronic device employed by the methods for obtaining information in accordance with the first to third embodiments, based on the method for obtaining the information recorded by the first to third embodiments of the present application, the skilled person in the art can know the specific structure and various variants of the electronic device of the fourth embodiment of the present invention. Therefore, such electronic device is not explained in detail herein. The electronic devices which are employed by the skilled person in the art to implement the method for obtaining the information in accordance with the first to third embodiments of the present application, all pertain to the scope to be sought by the present application.

One or more technical solution(s) provided by the present application at least has/have the following technical effects or advantages:

(1) Since in the present embodiment of the present application, the following technical solution is employed, so that the technical effect of decreasing the disturbance of the ambient light to the contents of the display unit is achieved, wherein the technical solution is that when the contents are being displayed on the display unit of the electronic device, the parameter information is sampled; and when the parameter information satisfies the predetermined first condition, the displayed parameter value corresponding to the display on the display unit is adjusted from the first value to the second value different from the first value, so as to further improve the contrast of the contents under the ambient light where the electronic device is located.

(2) Since in the present embodiment of the present application, the displayed parameter value can be the optical parameter value of the optical unit provided on the surface of the display unit and the contrast of the contents under the ambient light where the electronic device is located can be improved by adjusting the optical parameter value, the technical effect of optically decreasing the disturbance of the ambient light to the contents can be achieved.

(3) Since in the present embodiment of the present application, the contrast of the contents under the ambient light where the electronic device is located can be improved by adjusting the display brightness, contrast or the tone of the contents, the means for decreasing the disturbance of the ambient light to the contents can be diversified.

(4) In the present embodiment of the present application, the parameter information is in particular the behaviour features of the user to use the electronic device, and in turn the adjustment to the displayed parameter value is determined by the determination about the behaviour features. Since the behaviour of the user can accurately reflect the disturbance degree of the ambient light to the contents, the technical effect of more accurately adjusting the displayed parameter value is achieved. This can better meet the needs of the user and the experience of the user can be further improved.

(5) In the present embodiment of the present application, when determining whether the behaviour features satisfy the predetermined first condition, it mainly determines whether the behaviour features indicate the light illumination intensity corresponding to the ambient light is larger than the light illumination intensity threshold value for the user. The process of determining whether the behaviour features indicate the light illumination intensity corresponding to the ambient light is larger than the light illumination intensity threshold value for the user can again be classified into several cases, for example, to determine whether the behaviour features indicate the first shading object and the head of the user satisfy the predetermined first relationship, to determined whether the behaviour features indicate the second shading object and the display unit have the predetermined second relationship, or the like. As a result, the means for determining the behaviour features satisfy the predetermined first condition can be diversified.

The skilled person in the art should understand that the devices and/or apparatus, as well as respective steps of the method provided by the above embodiments of the present application, can each be integrated into a single computing device, or distributed over a network consisted of several computing devices. Optionally, they can be implemented by program codes which can be executed by the computing device. Consequently, they can be stored within the storing device, and be executed by the computing device, or they can be respectively manufactured as integrate circuit modules, or some modules or steps thereof are made as a single integrate circuit module. In this manner, the present invention is not limited to any combination of particular hardware and software.

Although the present invention has been explained with reference to the drawings, the embodiments shown in the drawings are only illustrative, instead of limiting the present invention. Although some embodiments of the general inventive concept are illustrated and explained, it would be appreciated by those skilled in the art that modifications and variations may be made in these embodiments without departing from the principles and scope of the general inventive concept of the disclosure, the scope of which is defined in the appended claims and their equivalents.

The invention claimed is:

1. A method for processing information, applicable in an electronic device comprising a display unit, characterized in that, the method comprises the steps of:
sampling a parameter information, when contents are being displayed on the display unit;
determining whether the parameter information satisfies a predetermined first condition; and
adjusting a displayed parameter value corresponding to display of the display unit from a first value to a second value different from the first value, so as to improve contrast of the contents under ambient light where the electronic device is located, when the parameter information satisfies the predetermined first condition;
wherein the parameter information comprises behaviour features using the electronic device;
wherein a process of determining whether the parameter information satisfies the predetermined first condition includes determining whether the behaviour features indicate that a light illumination intensity corresponding to the ambient light is larger than a threshold value of a light illumination intensity for a user;
wherein the process of determining whether the behaviour features indicate that the light illumination intensity corresponding to the ambient light is larger than the threshold value of the light illumination intensity for the user includes:
determining whether the behaviour features indicate a first shading object and a head of the user meet a predetermined first relationship, wherein the predetermined first relationship is: a distance of the first shading object from the head being less than a predetermined distance threshold value, or the first shading object being in contact with the head, or an angle between the first shading object and the head being within a predetermined range of angles;
wherein when a surface of the display unit is provided with an optical unit, the displayed parameter value is an optical parameter value of the optical unit, and the process of adjusting the displayed parameter value from a first value to a second value different from the first value is to adjust the optical parameter value from a first optical parameter value to a second optical parameter value different from the first optical parameter value;
wherein a first absorption capability of the optical unit to the ambient light when the optical parameter value is the second optical parameter value, is larger than a second absorption capability of the optical unit to the ambient light when the optical parameter value is the first optical parameter value; and
wherein a third absorption capability of the optical unit to the first light corresponding to the contents when the optical parameter value is the second optical parameter value, is larger than a fourth absorption capability of the optical unit to the first light when the optical parameter value is the first optical parameter value.

2. The method as claimed in claim 1, wherein:
in a case that the optical unit comprises a liquid crystal layer provided on a surface of the display unit and comprising at least one liquid crystal particle and a linear polarizer provided on a surface of the liquid crystal layer, the process of adjusting the optical parameter value from the first optical parameter value to the second optical parameter value different from the first optical parameter value, is to adjust the at least one liquid crystal particle from a first alignment to a second alignment different from the first alignment; and
wherein when the at least one liquid crystal particle is in the first alignment, the absorption capability of the linear polarizer to the ambient light is the second absorption capability, and the absorption capability of the linear polarizer to the first light is the fourth absorption capability; and when the at least one liquid crystal particle is in the second alignment, the absorption capability of the liner polarizer to the ambient light is the first absorption capability, and the absorption capability of the linear polarizer to the first light is the third absorption capability.

3. The method as claimed in claim 2, wherein:

when the at least one liquid crystal particle is in the second alignment, the linear polarizer is used to absorb light of the ambient light whose polarized component is parallel to a polarized direction of the linear polarizer, so that the ambient light are converted into a first linearly polarized light having a polarized direction perpendicular to an absorption direction of the linear polarizer;

the liquid crystal layer is used to convert the first linearly polarized light into a first circularly polarized light, and the display unit is used to reflect the first circularly polarized light back to the liquid crystal layer, so as to obtain a second circularly polarized light;

the liquid crystal layer is also used to convert the second circularly polarized light into a second linearly polarized light having a polarized direction parallel to an absorption direction of the linear polarizer;

the linear polarizer is also used to absorb the second linearly polarized light, and the display unit is also used to generate the first light being the third linearly polarized light;

the liquid crystal layer is also used to convert the third linearly polarized light into a third circularly polarized light, and the linear polarizer is also used for absorbing component of the third circularly polarized light having a polarized direction parallel to the absorption direction of the linear polarizer;

when the at least one liquid crystal particle is in the first alignment, the liquid crystal layer cannot convert the first linearly polarized light into the second linearly polarized light, and thus it only filters out components of the ambient light parallel to the absorption direction of the linear polarizer by means of the linear polarizer, instead of the first linearly polarized light, so that the second absorption capability is less than the first absorption capability; and the liquid crystal layer cannot convert the third linearly polarized light into the third circularly polarized light, and the absorption direction of the linear polarizer is perpendicular to the polarized direction of the third linearly polarized light, so that it does not function to absorb the third linearly polarized light, and as such, the third linearly polarized light will not be absorbed by the linear polarizer, so that the fourth absorption capability is less than the third absorption capability.

4. The method as claimed in claim 2, wherein the process of adjusting the at least one liquid crystal particle from the first alignment to the second alignment different from first alignment includes:

adjusting a voltage applied at two ends of the liquid crystal layer from a first voltage to a second voltage different from the first voltage, so that the at least one liquid crystal particle is adjusted from the first alignment to the second alignment by the second voltage.

5. The method as claimed in claim 1, wherein the process of determining whether behaviour features using the electronic device indicate that the light illumination intensity corresponding to the ambient light is larger than the threshold value of the light illumination intensity for the user further includes:

determining whether the behaviour features indicate a second shading object and the display unit meet a predetermined second relationship.

* * * * *